United States Patent
Long

(10) Patent No.: US 8,651,813 B2
(45) Date of Patent: *Feb. 18, 2014

(54) FLUID DYNAMIC BODY HAVING ESCAPELET OPENINGS FOR REDUCING INDUCED AND INTERFERENCE DRAG, AND ENERGIZING STAGNANT FLOW

(75) Inventor: Donald James Long, San Jose, CA (US)

(73) Assignee: Donald James Long, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/474,510

(22) Filed: May 29, 2009

(65) Prior Publication Data

US 2010/0303634 A1     Dec. 2, 2010

(51) Int. Cl.
*F01D 5/12*     (2006.01)

(52) U.S. Cl.
USPC ............................................. 416/90 A

(58) Field of Classification Search
USPC ........................................ 416/90 A, 90 R, 91
See application file for complete search history.

(56) References Cited

U.S. PATENT DOCUMENTS

| | | | |
|---|---|---|---|
| 2,041,786 A | | 5/1936 | Stalker |
| 2,135,887 A | * | 11/1938 | Fairey ............................. 416/23 |
| 2,160,323 A | * | 5/1939 | Barnett ..................... 416/231 R |
| 2,237,275 A | | 4/1941 | Koppen |
| 2,407,223 A | * | 9/1946 | Caldwell .................... 123/41.65 |
| 2,507,611 A | | 5/1950 | Pappas et al. |
| 2,571,304 A | | 10/1951 | Stalker |
| 2,587,359 A | | 2/1952 | Milans |
| 2,597,663 A | | 5/1952 | Michard |
| 2,842,214 A | * | 7/1958 | Prewitt ............................ 416/39 |
| 3,208,693 A | | 9/1965 | Riedler et al. |
| 3,363,859 A | | 1/1968 | Watts |
| 3,604,661 A | * | 9/1971 | Mayer, Jr. ..................... 244/207 |
| 3,776,170 A | * | 12/1973 | Slemmons ............... 114/102.13 |
| 3,845,918 A | | 11/1974 | White, Jr. |
| 3,897,029 A | | 7/1975 | Calderon |
| 4,109,885 A | * | 8/1978 | Pender .......................... 244/7 R |
| 4,478,380 A | | 10/1984 | Frakes |
| 4,641,799 A | | 2/1987 | Quast et al. |
| 4,664,345 A | | 5/1987 | Lurz |
| 4,671,473 A | * | 6/1987 | Goodson ..................... 244/199.4 |
| 4,832,571 A | * | 5/1989 | Carrol ....................... 416/132 B |
| 4,860,680 A | | 8/1989 | Faulconer |
| 5,039,032 A | | 8/1991 | Rudolph |
| 5,255,881 A | | 10/1993 | Rao |

(Continued)

FOREIGN PATENT DOCUMENTS

GB     WO2007007108 A1     1/2007

*Primary Examiner* — Edward Look
*Assistant Examiner* — Liam McDowell
(74) *Attorney, Agent, or Firm* — Thomas Schneck; Mark Protsik

(57) ABSTRACT

A fluid dynamic body provides one or more fixed size escapelets through a foil body to reduce the induced and interference drag caused by trailing vortices and similar wake turbulence. The escapelets, which can be provided in both aerodynamic and hydrodynamic structures, such as wings, tail sections; rotary blades, guy wire frames, wing sails, and various underwater keels and wing keels. The escapelets transfer energy from an inlet located in the high-pressure surface of the foil or foil body to an outlet located in the lower-pressure surface, allowing energy that would normally form a vortex at the tip of the foil to be redirected and dissipated in a beneficial way. As a result, drag is reduced and fuel economy is increased. For example, in aircraft, escapelets can increase the authority of ailerons and similar flight control surfaces, allowing aircraft that were not previously spin recovery rated to become spin recoverable.

20 Claims, 13 Drawing Sheets

(56) References Cited

U.S. PATENT DOCUMENTS

| | | |
|---|---|---|
| 5,374,013 A | 12/1994 | Bassett et al. |
| 5,381,988 A * | 1/1995 | Kattas ................. 244/153 A |
| 5,549,260 A | 8/1996 | Reed, III |
| 5,634,613 A | 6/1997 | McCarthy |
| 5,788,190 A | 8/1998 | Siers |
| 5,791,875 A | 8/1998 | Ngo |
| 5,806,807 A | 9/1998 | Haney |
| 5,823,480 A | 10/1998 | LaRoche |
| 5,915,651 A | 6/1999 | Asaki et al. |
| 6,293,497 B1 | 9/2001 | Kelley-Wickemeyer et al. |
| 6,328,265 B1 | 12/2001 | Dizdarevic |
| 6,435,815 B2 * | 8/2002 | Harvey et al. ................. 415/115 |
| 6,622,973 B2 * | 9/2003 | Al-Garni et al. ............... 244/206 |
| 6,722,615 B2 | 4/2004 | Heller et al. |
| 6,866,233 B2 | 3/2005 | Patel et al. |
| 6,892,988 B2 | 5/2005 | Hugues |
| 6,905,092 B2 | 6/2005 | Somers |
| 7,048,235 B2 | 5/2006 | McLean et al. |
| 7,100,875 B2 | 9/2006 | Shmilovich et al. |
| 7,134,631 B2 | 11/2006 | Loth |
| 7,150,434 B1 | 12/2006 | Bandyopadhyay |
| 7,281,900 B2 * | 10/2007 | Zientek ..................... 416/231 B |
| 7,490,573 B1 * | 2/2009 | Dickinson ..................... 114/248 |
| 2005/0207895 A1 * | 9/2005 | Dunn ......................... 416/231 R |
| 2007/0034746 A1 | 2/2007 | Shmilovich et al. |
| 2007/0252047 A1 | 11/2007 | Pal |
| 2008/0232973 A1 * | 9/2008 | Ferman ..................... 416/236 R |

* cited by examiner

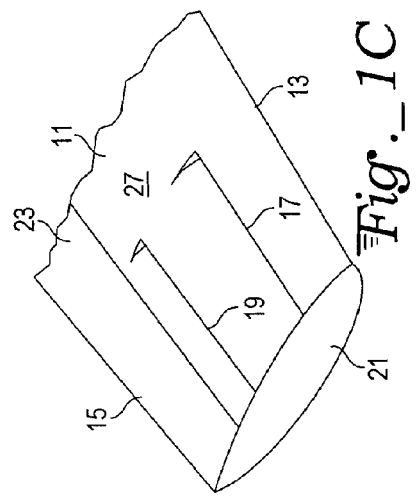
Fig._1A
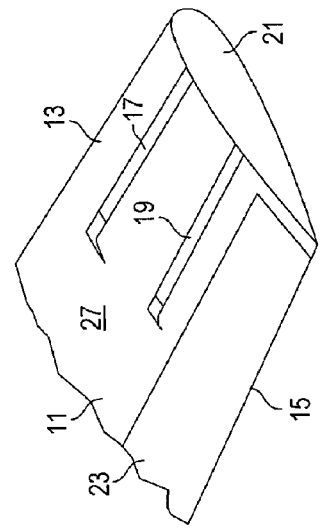
Fig._1B
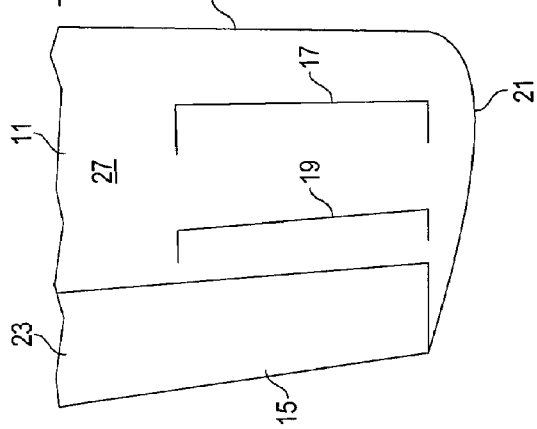
Fig._1C
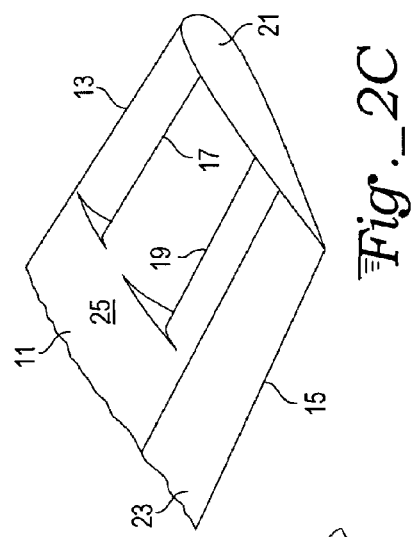
Fig._2A
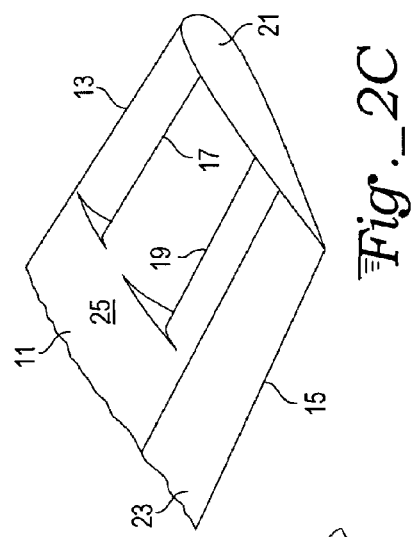
Fig._2B
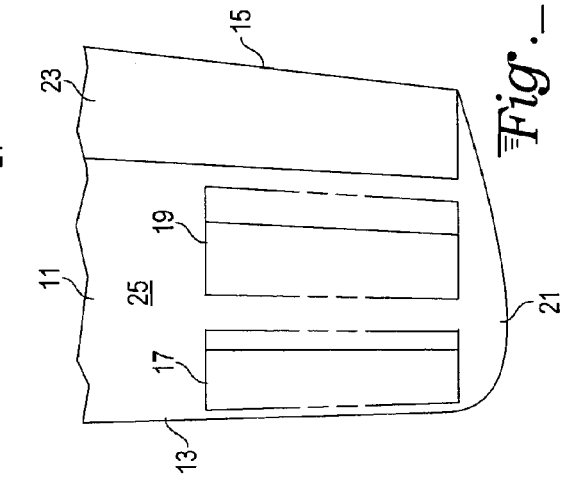
Fig._2C

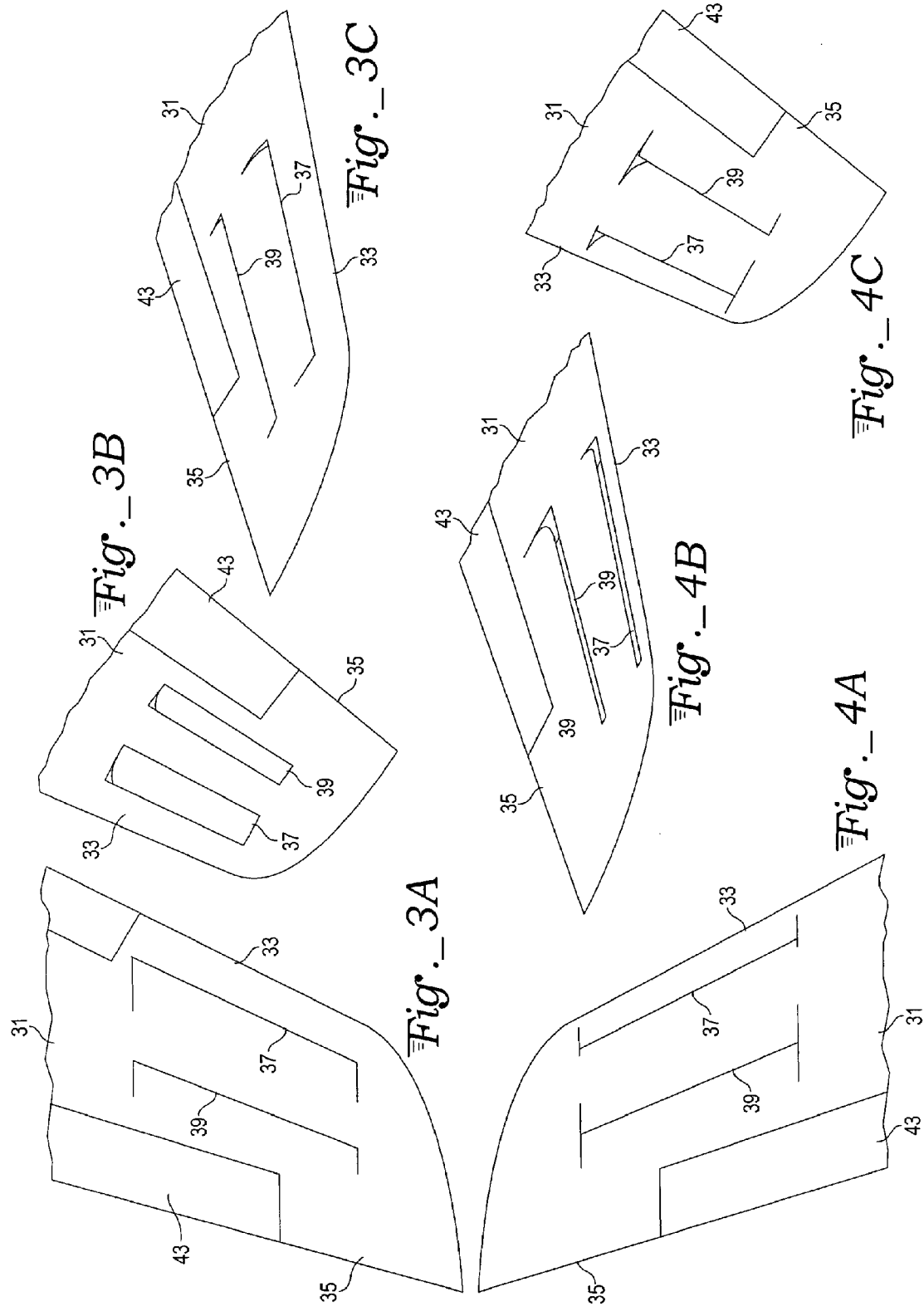

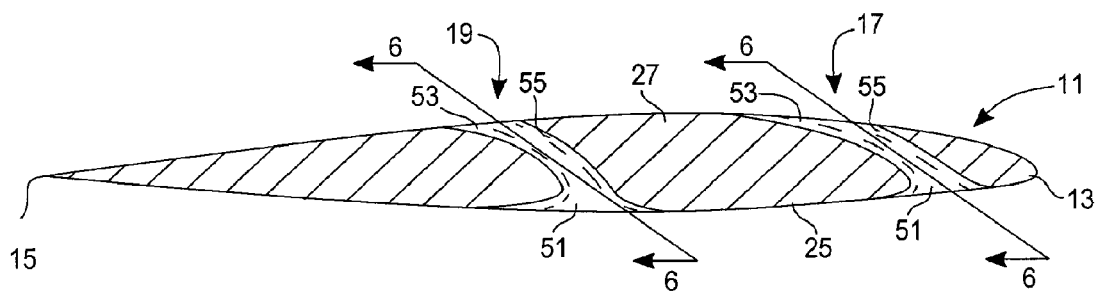
Fig._5
Fig._6A
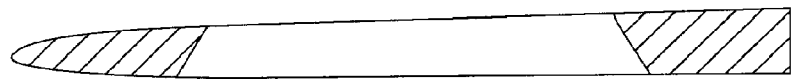
Fig._6B
Fig._6C
Fig._6D
Fig._6E
Fig._6F

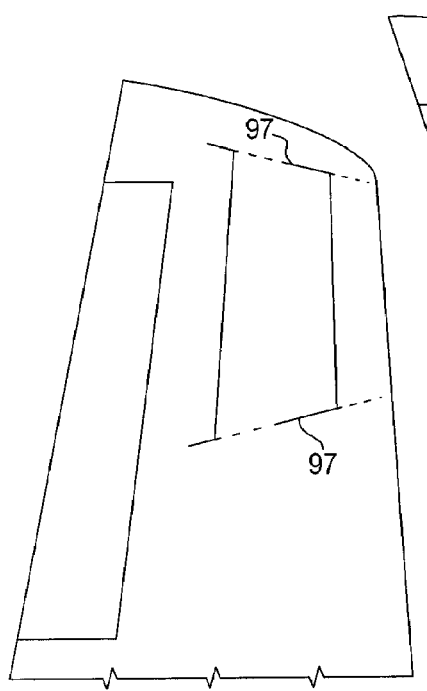
Fig._11
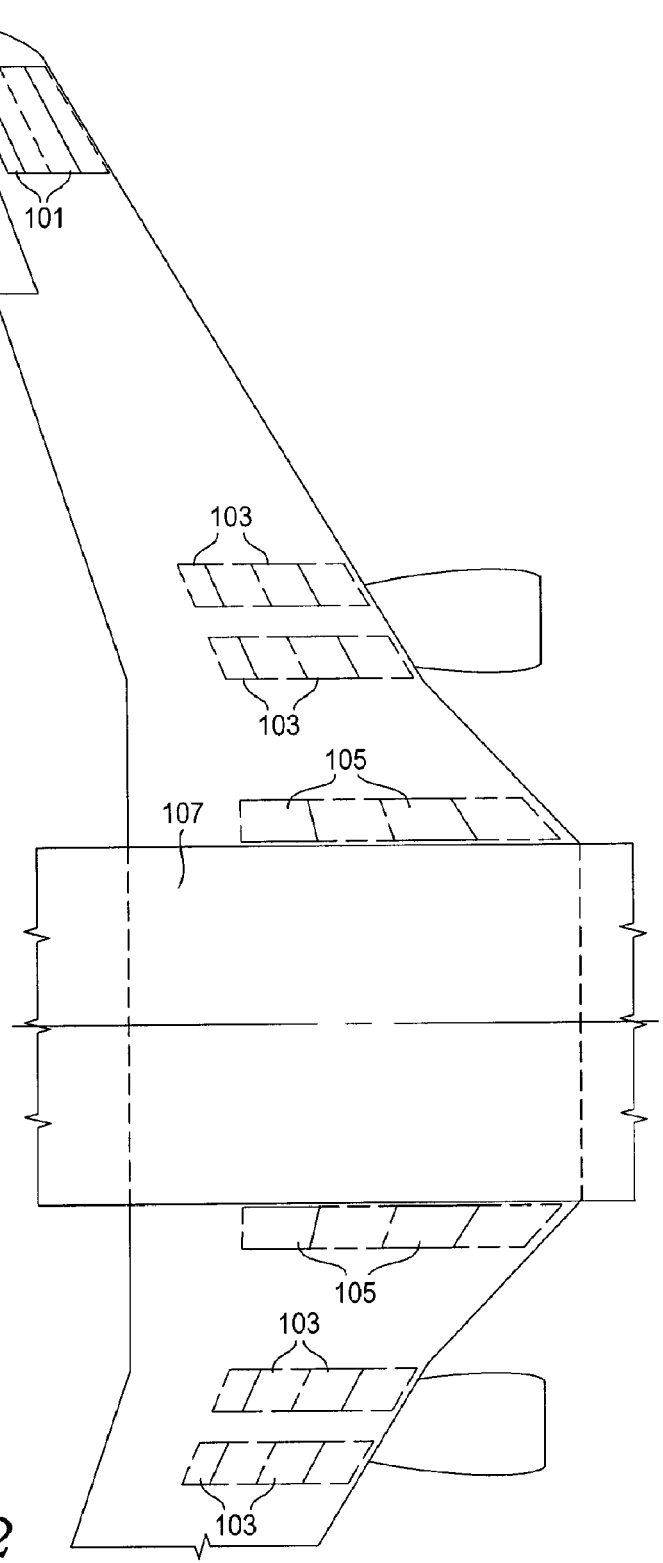
Fig._12

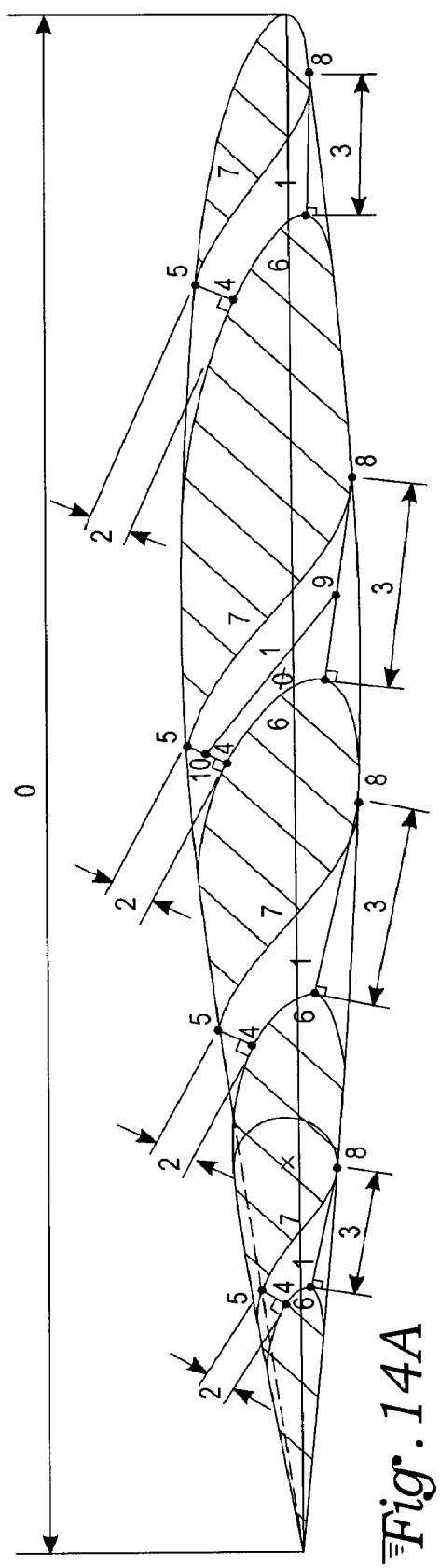
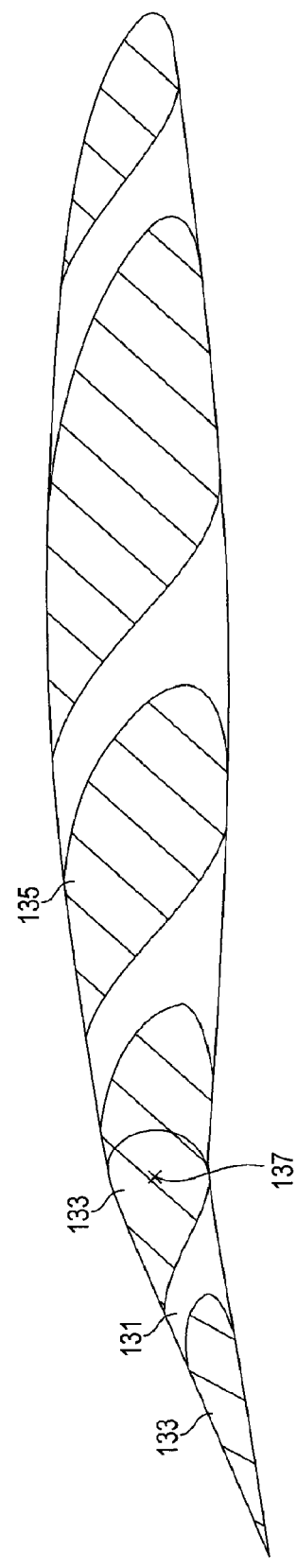
Fig. 14A
Fig. 14B

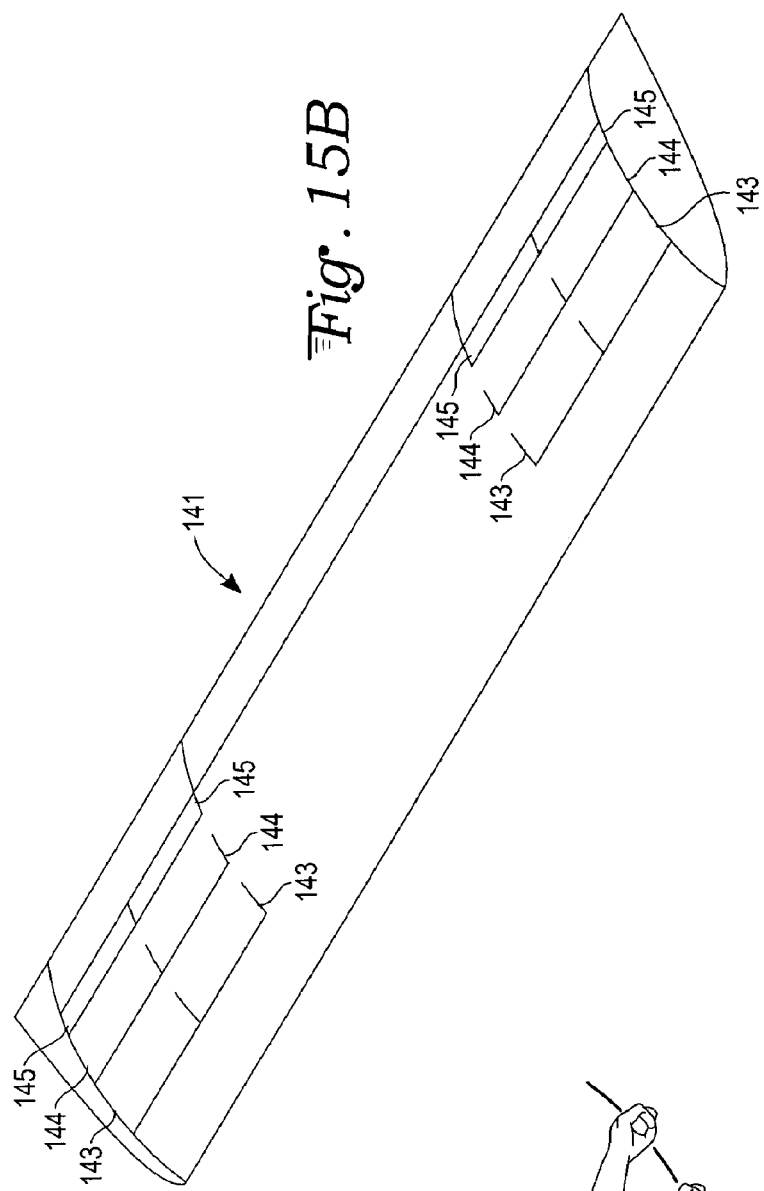
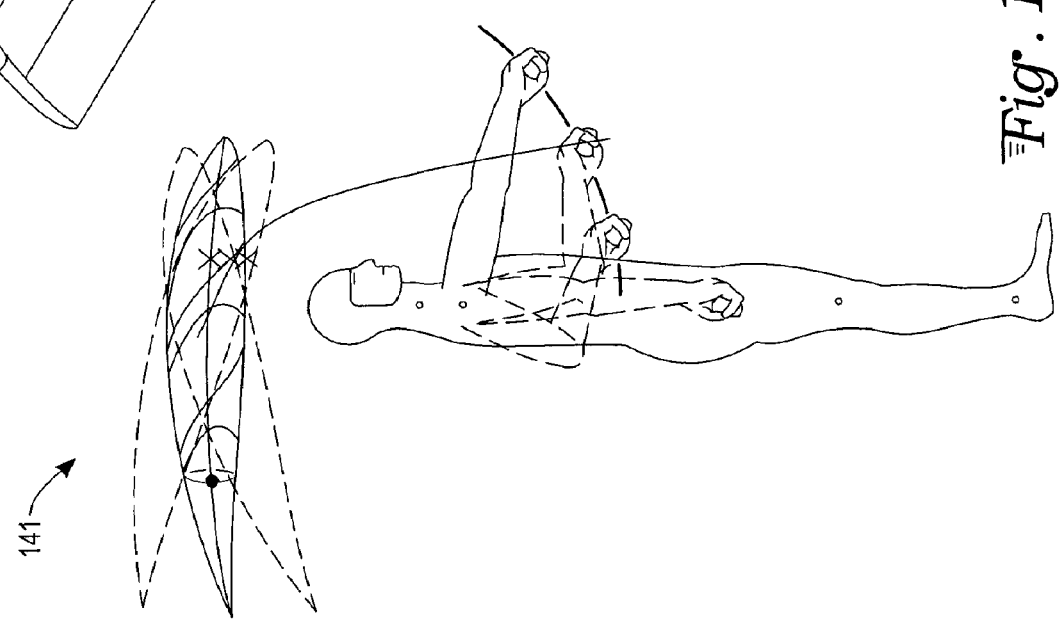

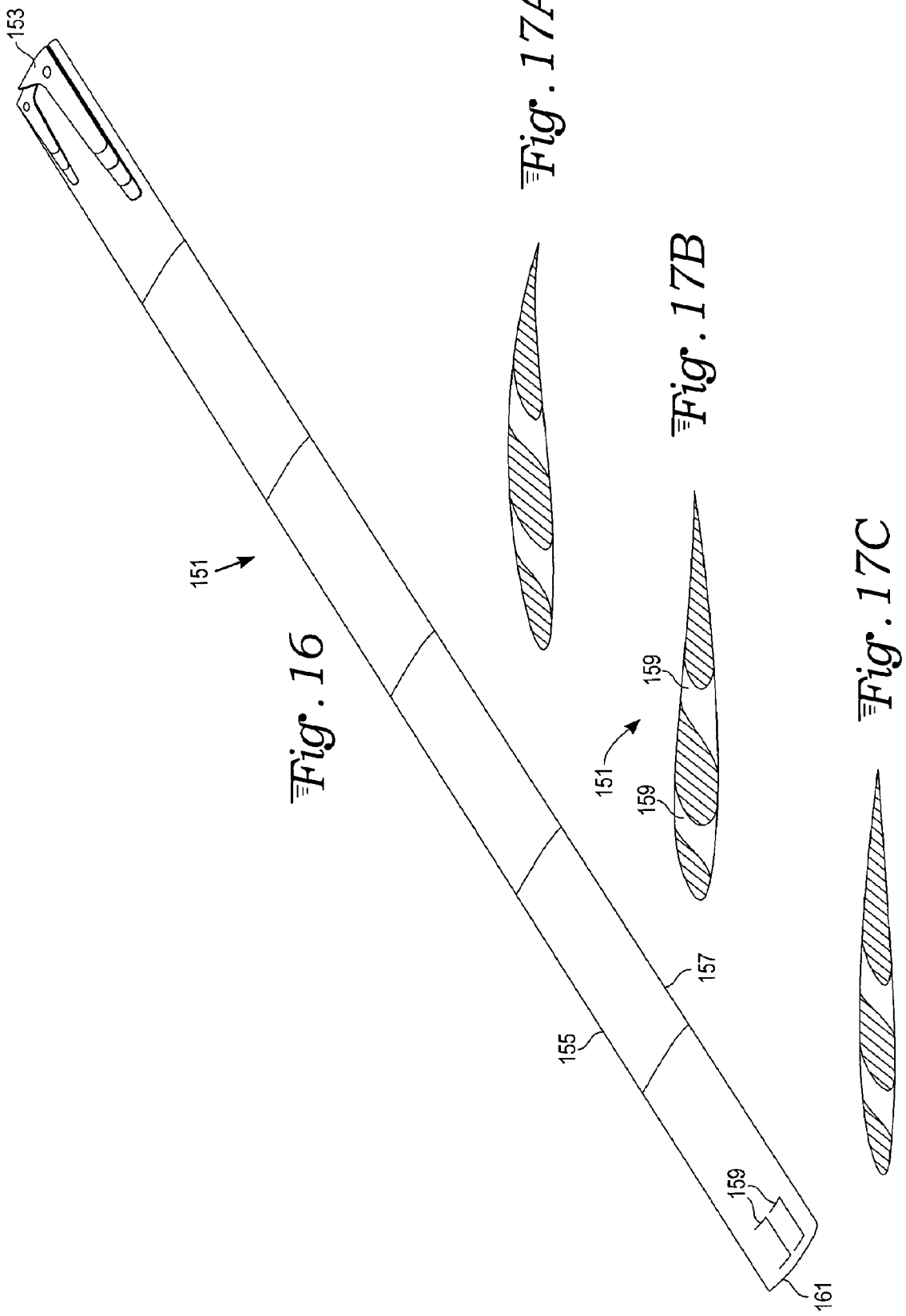

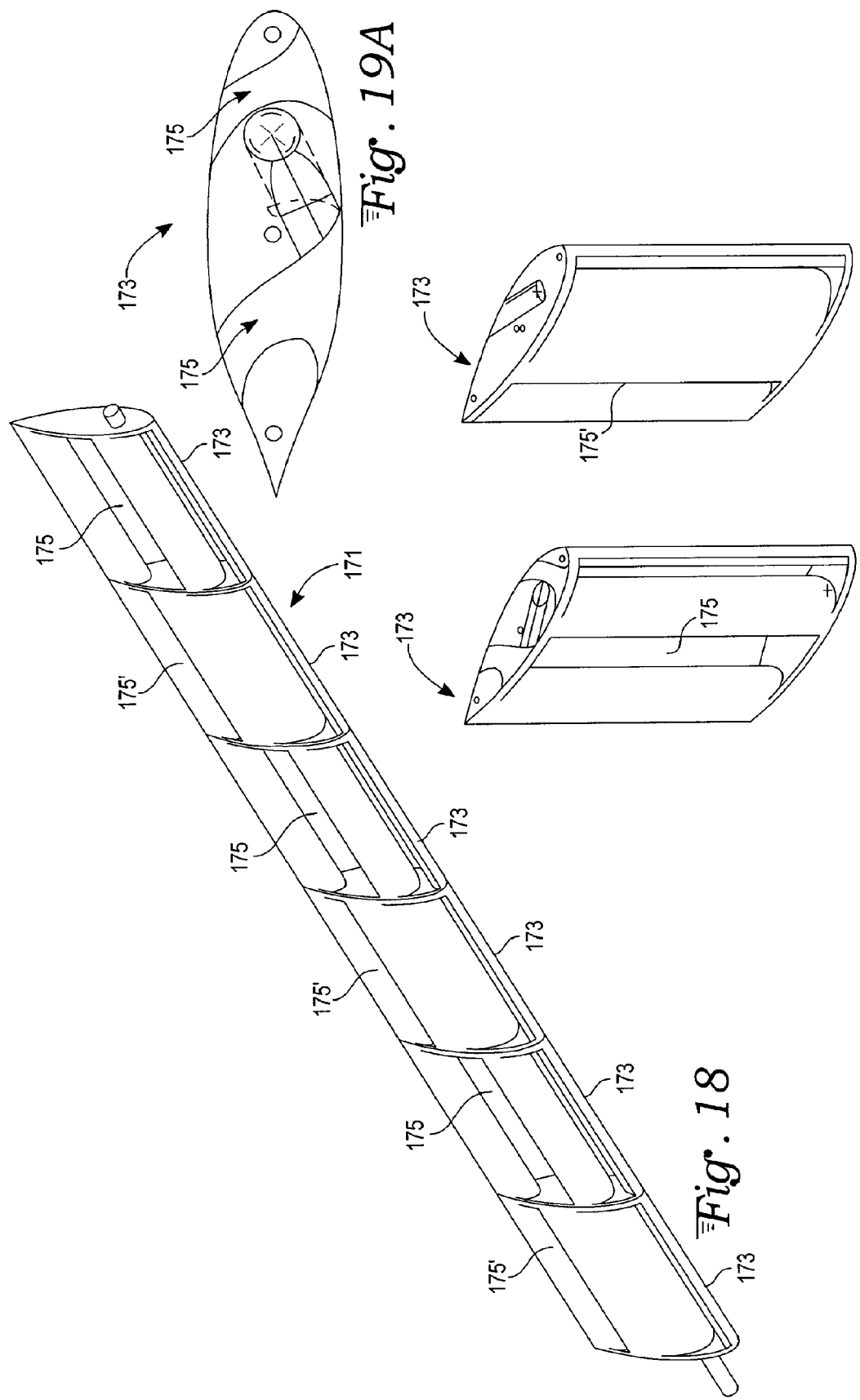

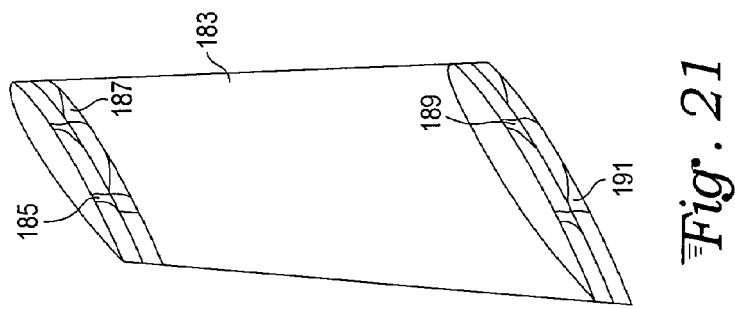
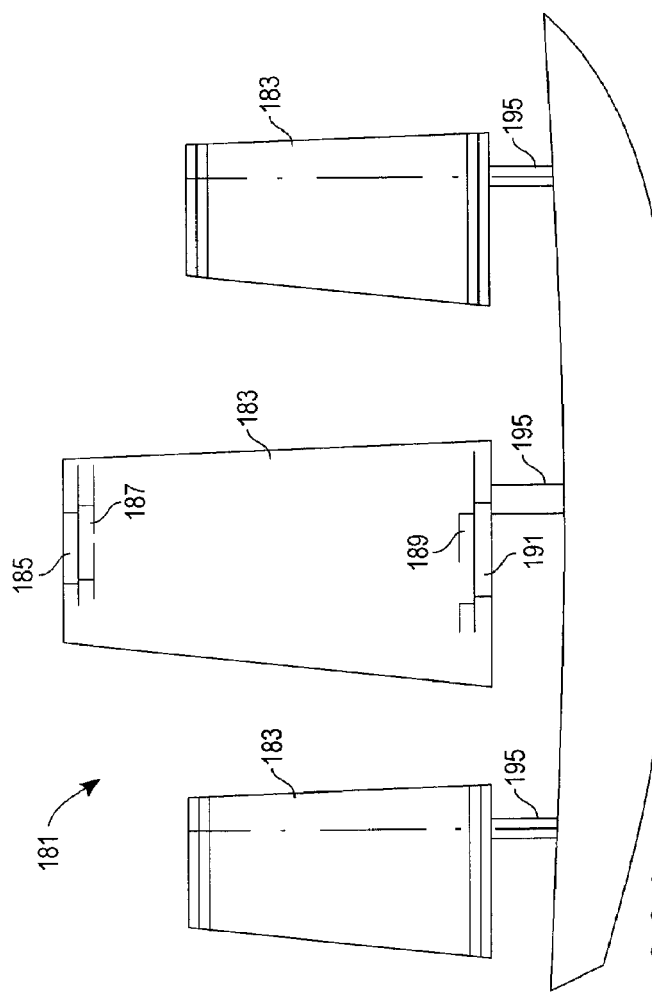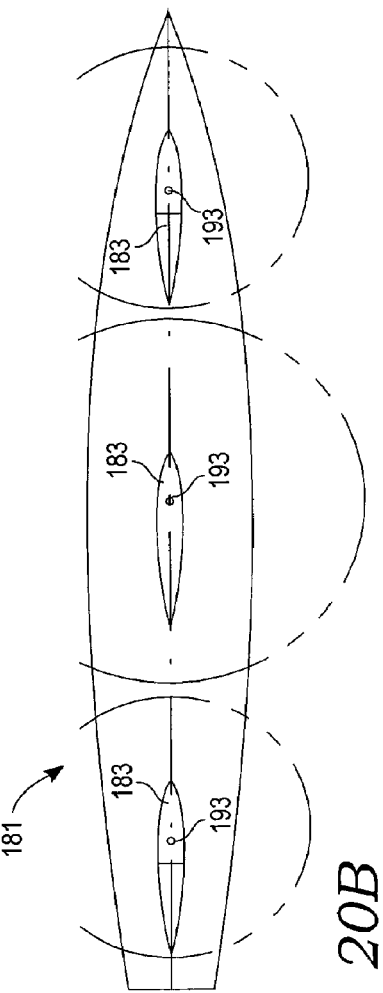
Fig. 20A
Fig. 20B
Fig. 21

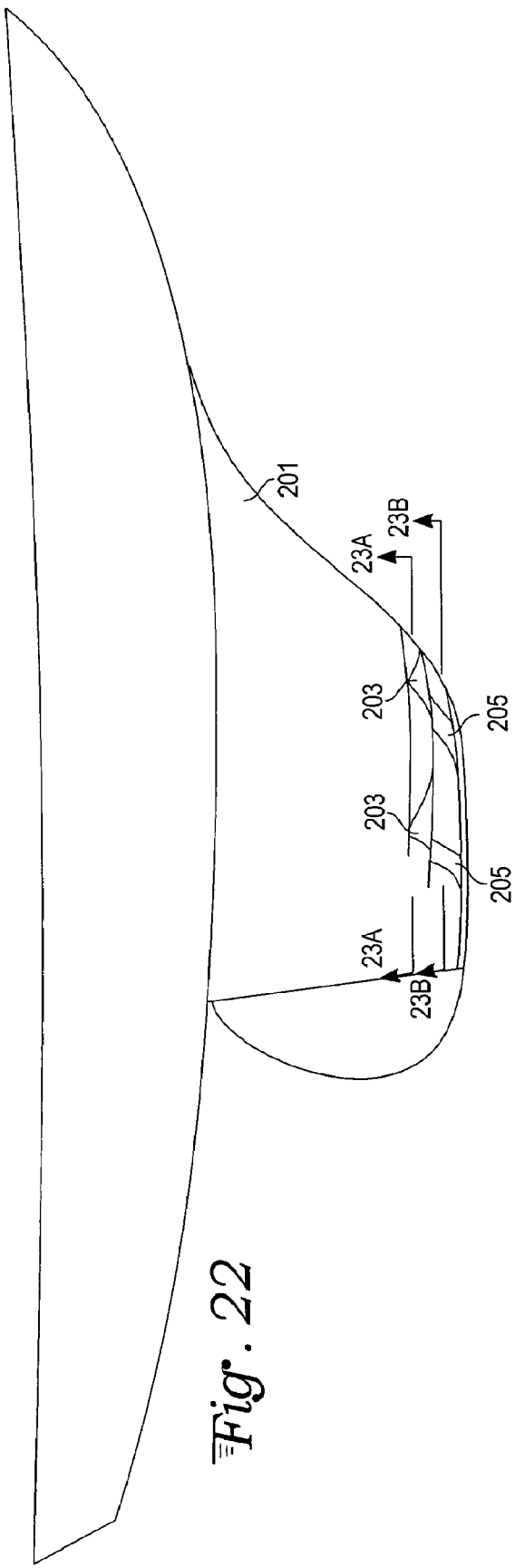
Fig. 22
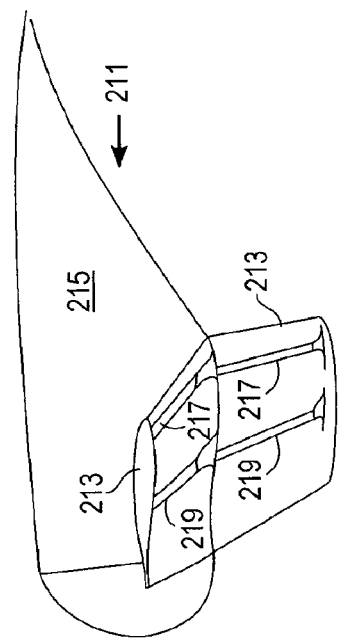
Fig. 24
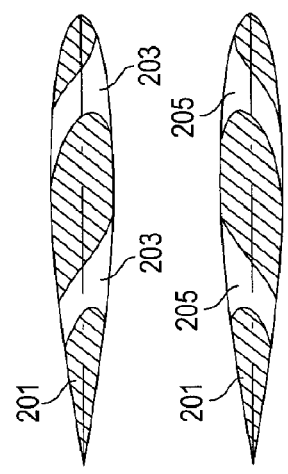
Fig. 23A
Fig. 23B

FLUID DYNAMIC BODY HAVING ESCAPELET OPENINGS FOR REDUCING INDUCED AND INTERFERENCE DRAG, AND ENERGIZING STAGNANT FLOW

TECHNICAL FIELD

The present invention relates to improvements to fluid dynamic bodies and related fluid dynamic structures for influencing or controlling aerodynamic or hydrodynamic flows to reduce drag, such as drag and turbulence induced by wingtip vortices of an aircraft, cooling and ventilating drags, or such as is found in the wake of a watercraft.

BACKGROUND ART

Various devices have been used for years in many aircraft wing designs in order to prevent the airflow from separating prematurely from the wing at high angles of attack, and thereby reduce the stall speed and improve handling at low speeds. Air from below the wing accelerates through the device and exits rearward and substantially parallel to the upper wing surface, energizing the boundary layer and delaying separation. A similar approach provides a pressurized discharge from wing surface openings, either from compressed air tanks, pumps, or from the jet engines, to accomplish a similar goal. Because most of the devices also tend to contribute to drag at cruising speeds, retractable devices may be used instead to provide adjustable modifications that can be closed when not needed. Other devices may also be used to reduce wave drag under transonic conditions to distribute pressure and increase the critical Mach number, thereby improving performance at such speeds. Variations of this basic theme of using slots, slats or other devices to ensure more attached flow across the wing surfaces and delayed boundary layer separation are described in U.S. Pat. No. 2,041,786 (Stalker); U.S. Pat. No. 2,507,611 (Pappas et al.); U.S. Pat. No. 2,571,304 (Stalker); U.S. Pat. No. 2,587,359 (Milans); U.S. Pat. No. 3,208,693 (Riedler et al.); U.S. Pat. No. 3,363,859 (Watts); U.S. Pat. No. 3,897,029 (Calderon); U.S. Pat. No. 4,641,799 (Quast et al.); U.S. Pat. No. 4,664,345 (Lurz); U.S. Pat. No. 5,255,881 (Rao); U.S. Pat. No. 5,788,190 (Siers); U.S. Pat. No. 6,293,497 (Kelley-Wickemeyer et al.); U.S. Pat. No. 6,328,265 (Dizdarevic); U.S. Pat. No. 6,905,092 (Somers); U.S. Pat. No. 7,048,235 (McLean et al.); and U.S. Patent Application Publication No. 2007/0034746 (Shmilovich et al).

Another problem in aircraft design is the formation of trailing vortices and wake turbulence during flight. Throughout the history of aeronautics, aircraft designers have had to deal with the energy consuming effects of wingtip vortices, which form at the tip of a wing where higher pressure air from beneath the wing flows in a generally span-wise direction around the wingtip to the lower pressure region above the wing. Wingtip vortices have been considered by many experts to be an essentially unavoidable consequence of a wing producing lift. These vortices are associated with lift-induced drag and are a major component of wake turbulence. Smaller vortices are induced at other points on an aircraft wherever there is an abrupt change in planform or contour, such as at the outboard tips of wing flaps, ailerons, horizontal stabilizers, elevators and other flight control surfaces. The drag and wake turbulence from the vortices have a negative impact on fuel efficiency and flight performance of the aircraft, and also pose a safety hazard to any aircraft that follow too closely or otherwise cross the wake.

Various solutions have been developed in an effort to reduce the formation of trailing vortices, especially wingtip vortices. Since wingtip vortices only affect that portion of a wing closest to its tip, one partial solution is to use a higher aspect ratio wing (longer wingspan and/or reduced chord), but this also tends to reduce aircraft maneuverability and adds structural weight. Another approach is to modify the lift distribution along the span to generate more lift at the wing root and less toward the wing tip, by modifying the wing planform and twist. However, these solutions do not make full use of the wingspan to efficiently produce lift.

A number of wingtip devices have been designed to allow nearly the entire wingspan to produce lift, while simultaneously altering the airflow near the wingtips in order to affect the vortices or to change the pattern of vorticity so as to reduce the associated drag. The intended result is reduced drag, with a corresponding improvement in fuel efficiency. Drooped (Hoerner) wingtips focus the vortex away from the upper wing surface. Winglets, a near-vertical upward or downward extension of the wingtips, cause the vortex to strike the surfaces of the winglet so as to generate an inward and slightly forward force, and thereby convert some of the vortex energy into an apparent thrust. Wingtip fences are winglet variations that may have surfaces extending both above and below the wingtip to reduce the span-wise component of airflow that leads to wingtip vortices, but create new vortices at the fence tips as well as interference drag, albeit displaced from the main wing. Blended winglets smoothly curve up, increasing their cant gradually to reduce interference drag that would otherwise occur at the wing/winglet junction. Raked wingtips have a higher degree of sweep than the rest of the wing. Various wingtip devices are described, for example, in U.S. Pat. No. 5,039,032 (Rudolf); U.S. Pat. No. 5,634,613 (McCarthy); U.S. Pat. No. 6,722,615 (Heller et al.); and U.S. Pat. No. 6,892,988 (Hugues).

In U.S. Pat. No. 5,823,480, La Roche provides a wing grid having at least two parallel staggered "winglets" extending outward from the free end (tip) of the wing. The winglets, which in this case are essentially parallel to the main wing rather than upward extending, subdivide the air circulation at the tip so that the span-wise lift distribution is more regular, decreasing induced resistance. In one embodiment, this wing grid can be retracted into the end of the wing.

In U.S. Pat. No. 4,478,380, Frakes discloses a wingtip vortex suppressor that utilizes a scoop having an inlet at a lower leading surface and an outlet at an upper trailing surface to reduce the pressure differential at the wing's trailing edge. The scoop is inboard of a turbulence fence at the wingtip. In another arrangement, U.S. Pat. No. 5,806,807 to Haney, has both a deflector extending from the top surface of the wing inboard of the tip and an air passage extending from an inlet on a high pressure side of an airfoil through the airfoil to an outlet on a low pressure side of the airfoil, with the outlet positioned between the deflector and the wing tip. The deflector and air passage work in combination to attenuate the wingtip vortex. In both patents it appears that the fence or deflector is an essential component for vortex reduction.

In U.S. Pat. No. 5,791,875, Ngo describes a system providing a source of positive fluid pressure interior to the wing and a fluid router (curved slots in lower surface of the wingtip) that directs the fluid inboard against the outward airflow in order to reduce the wingtip vortex. Similarly, in U.S. Pat. No. 7,134,631, Loth provides a tip circulation control that blows air out from the very end of the wing in order to cancel opposing vorticity. In U.S. Pat. No. 7,100,875, Shmilovich et al discharge a jet air stream from a set of nozzles at the wingtips and moves them cyclically back and forth in order to dissipate and scatter wingtip vortices. Although from a safety standpoint any reduction in trailing vortices is an improvement, from an energy efficiency standpoint the amount of energy required to sustain such counteracting airflows tends to defeat any fuel savings that might be achieved by a decrease in drag.

Trailing vortices and wake turbulence can also cause drag in other fluid dynamic structures, such as in rotor blades in helicopters and wind-power turbines, sails (which are also wings), and underwater surfaces such as hydrofoils, hulls, centerboards, keels, rudders and screws of various watercraft including submersibles. U.S. Pat. No. 5,374,013 to Bassett et al. describes one approach to reducing drag in a truck by providing a pressure shell around the rear of the truck body with better boundary flow around the truck. In any of these fluid dynamic structures, it is desired to realize fuel savings and safety improvements by reducing trailing vortices and wake turbulence, whether from wings and other flight control surfaces on aircraft, or from any of the other foil-like or bluff bodies.

SUMMARY DISCLOSURE

A fluid dynamic section in accord with the present invention comprises a foil body for use in a fluid dynamic environment and having one or more fixed size escapelets in the form of static passages integrated into the foil body and leading from a first higher pressure surface of the body to a second lower pressure surface of the body. Each escapelet is configured in size, shape, location, orientation and number so as to redirect any span-wise component of energy in a kind of shortcut from the high-pressure side to the low-pressure side of the structure, beneficially releasing energy and preempting the normal formation of vortices. Whatever span-wise component of fluid flow that might leak around an end of the foil body gets caught up in the high velocity current exiting longitudinally from the escapelet outlets. Unlike conventional slots, each escapelet is sized and positioned to minimize its impact on the longitudinal component flow, thereby improving the lift-to-drag ratio and resulting in dramatic fuel savings. The "longitudinal" flow direction refers always in this specification to the chordwise (fore-aft) direction, i.e., from the leading to trailing edges of the foil body. Despite creating passages from the higher-pressure side to the lower-pressure side of fluid dynamic structures, the elimination of unproductive components of fluid flow from the use of these escapelets results in an overall increase in the effective aspect ratio by as much as 50% or more. Thus, the escapelets act to harness, redirect and release fluid dynamic energy in a manner that prevents chaotic energy dissipation and minimizes energy loss. As an additional benefit, escapelets located near wingtips effectively increase control authority to ailerons, thereby improving such authority even at high angles of attack up to and including spin conditions, while escapelets located inboard on the wings near the fuselage and/or on the horizontal tail sections may further improve spin recovery whenever needed.

Escapelets have fixed sizes that are typically such that their widths range from 1% to 15% of the fluid dynamic body's span. Escapelets may be generally installed between or around ribs or other structures of the fluid dynamic body, so lengths of the individual escapelets do not typically extend a full span. The cumulative span of a set of escapelets along a common planform of the fluid dynamic body is usually less than a half-span of the foil body. In one embodiment, the locations of the escapelets may be confined to an outboard portion of the fluid dynamic body half-span. Escapelet outlets from the lower-pressure side of the fluid dynamic body usually have a measure normal to the surface that may range anywhere from 10% to 110% of the measure of the corresponding escapelet inlet on the higher-pressure side of the fluid dynamic body, with the higher values generally applying to craft of higher design speeds. Escapelet outlets are located downstream or aft of the escapelet inlets. Escapelet sizes and locations may be modified to accommodate operation at higher subsonic Mach numbers or other operating conditions. The spanwise orientation of the escapelets generally follows the planform of the fluid dynamic body. For example, where the escapelet openings include one or more leading escapelets and/or one or more trailing escapelets, the leading escapelet openings may be substantially parallel to a leading edge of the fluid dynamic body, while the trailing escapelet openings may be substantially parallel to a trailing edge of the fluid dynamic body. The escapelets are carefully contoured to establish and maintain primarily streamline flow, and may include a preformed liner insert to eliminate any discontinuities or sharp intersections and ensure such streamlined surface smoothness and contours.

The fluid dynamic structures that could incorporate this improvement may include not only aircraft wings, but also aircraft control surfaces, such as ailerons, flaps, aircraft empennages, canards, including stabilizers, elevators, fins, rudders, together with rotor blades, propeller blades, turbofans, ducted fans, and wind tunnel drive fans, as found on both helicopters and wind-power turbines, as well as fluid dynamic bodies on various watercraft, including sails, wing sails and various underwater structures like keels, and various other structures such as cables, guy-wires, poles, power lines, stacks and towers. The presence of the escapelet openings in the various fluid dynamic bodies significantly reduce trailing vortices and wake turbulence, with a consequent reduction in drag and corresponding improvements in energy efficiency.

BRIEF DESCRIPTION OF THE DRAWINGS

The drawings illustrate some possible applications of the concept.

FIGS. 1A-1C and 2A-2C are various plan and isometric views of an outboard end portion of respective upper and lower wing surfaces for an unswept wing implementing an embodiment of the present invention.

FIGS. 3A-3C and 4A-4C are various plan and isometric views of an outboard end portion of respective upper and lower wing surfaces for a swept wing implementing another embodiment of the present invention.

FIGS. 7-11 are plan views of alternative wing embodiments in accord with the present invention.

FIG. 12 is a top plan view of a wing attached to a fuselage, and illustrating several different potential positions for escapelets in accord with the present invention.

FIGS. 14A-14B are chord-wise sectional views of generic fluid dynamic structures provided for specifying dimensions of escapelets. FIG. 14B also illustrates possible incorporation of an escapelet in a control surface, such as an aileron.

FIGS. 15A-15B are respective side and isometric views of an airfoil used as a parachute, hang glider or kite and implementing escapelets in the airfoil in accord with the present invention.

FIG. 16 is an isometric view of a rotary blade embodiment of the present invention.

FIGS. 17A-17C are various sections of an end of a rotary blade, as in FIG. 16, with one or more escapelets, for a propeller blade, a wind turbine blade and helicopter main and/or tail rotor blades, respectively.

FIG. 18 is an isometric view of a guy wire embodiment having foil sections of escapelets in accord with the present invention.

FIGS. 19A-19C are a cross-sectional view and two isometric views of segments of the foil sections in FIG. 18.

FIGS. 20A-20B are side view and top plan view of a ship having wing sails with escapelets therein in accord with the present invention.

FIG. 21 is an isometric view of a wing sail in FIGS. 20A-20B.

FIG. 22 is a side view of an underwater portion of a watercraft having a keel embodiment of the present invention.

FIGS. 23A-23B are sectional views taken through the lines 23A-23A and 23B-23B in FIG. 22.

FIG. 24 is an isometric view of a wing keel embodiment of the present invention.

DETAILED DESCRIPTION

Figure 7:
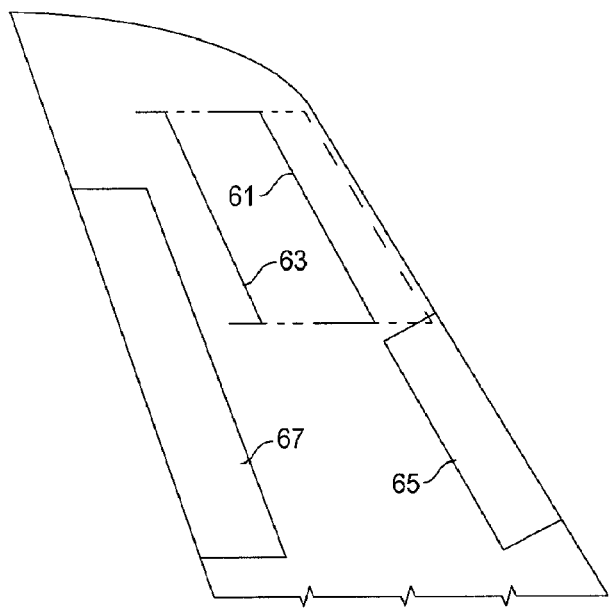

In order to better understand the improvements, we note first that slots, slats and slotted flaps have the purpose of increasing the maximum lift coefficient, thereby reducing the stall speed, while the escapelets provided within the various fluid dynamic bodies in accord with the present invention have instead the purpose of preemptively redirecting fluid flow energy before it can cause undesirable results such as vortices, wake turbulence, and drag with consequent wasteful energy dissipation. The escapelets harness, redirect and release the energy beneficially so as to minimize such energy losses. In addition to the benefits already discussed, escapelets may also be employed to reduce turbulence due to flow separation, thus making the associated flows more efficient.

"slot" (noun)—a long and narrow opening as between a wing and a Fowler flap; specif. a long and narrow spanwise passage in a wing usually near the leading edge for improving flow conditions at high angles of attack.

"slat" (noun)—any of certain long narrow vanes or auxiliary airfoils, e.g. as used in an automatic slot.

"automatic slot" (noun)—a slot in the leading edge of a wing created by the movement of a slat that is retained in the leading edge contour of a wing at most angles of attack, but automatically lifting away to create a slot as the stalling angle is approached.

"fixed slot" (noun)—a slot that remains open at all times; distinguished from an adjustable or an automatic slot.

A slotted flap is an adjustable mechanism on the trailing edge of a fluid dynamic foil section that moves into position when deployed. In contrast, an escapelet is a primarily streamline flow passage built into a fluid dynamic foil section.

The primarily streamline flow passages that form the escapelets through the fluid dynamic body act to improve fluid dynamic characteristics without physical changes in chord or camber of the fluid dynamic body, acting to reduce induced and interference drag by preempting or significantly reducing the formation of vortices and energizing stagnant flow. Additionally, the changes to fluid flow arising from the use of escapelets in some locations improve control authority of ailerons and/or other control surfaces and high-lift devices and enhance spin recovery. The end result is a unique device that accomplishes aerodynamic results never before achieved.

With reference to FIGS. 1A-1C, three views of the top of an end portion of a wing 11 with a leading edge 13 and a trailing edge 15 of the wing 11 are seen. The wing has escapelets 17 and 19 inboard of a wingtip 21 in accord with the present invention. An aileron 23 on the trailing edge 15 of the wing 11 is also seen. FIGS. 2A-2C show three views of the bottom side of the same wing 11. As seen in the various views, the escapelets 17 and 19 are passages leading from the lower wing surface 25 through the wing 11 to the upper wing surface 27. In this embodiment, two escapelets 17 and 19 are provided in series. A series of anywhere from one to seven escapelets could be provided along the local chord of the wing.

With reference to FIGS. 3A-3C, three views of the top of an end portion of another wing 31 with a leading edge 33 and trailing edge 35 of the wing 31, escapelets 37 and 39, and an aileron 43, are shown. FIGS. 4A-4C show the corresponding bottom side of the wing 31. Again, escapelets 37 and 39 are provided through the wing 31. In this instance, the wing is a swept wing, whereas in FIGS. 1A-1C and 2A-2C; an unswept wing was used. Escapelets can be provided with either an unswept wing 11 or swept wing 31 designs.

In both cases, the escapelets generally follow the planform of the wing. In the case of the unswept wing 11 in FIGS. 1A-1C and 2A-2C, this leads to the escapelets being oriented substantially parallel to the corresponding leading and trailing edges 13 and 15 of the wing 11. In the case of the swept wing 31 in FIGS. 3A-3C and 4A-4C, the leading and trailing edges 33 and 35 and the escapelets 37 and 39 essentially follow the planform of the wing 31.

The positions of the escapelets 17, 19, 37, and 39 on their wings 11 and 31 do not necessarily line up with the ailerons 23 and 43 or any other flight control structure of the wing. In the first case, the outer ends of escapelets 17 and 19 do happen to align with the outer edge of the aileron 23, but this is not required. The aileron 23 is seen to extend inboard beyond the views and beyond the inner ends of escapelets 17 and 19, but again, this is not necessarily required. In the swept wing example, the ends of the escapelets 37 and 39 do not align with either edge of the aileron 43, but rather the escapelets 37 and 39 are positioned to overlap the outer edge of the aileron 43. These escapelets 37 and 39 could just as easily align with say the outer edge of the aileron, as in the unswept wing example. Generally, it may be preferred for optimum performance that one or more escapelets be associated in some manner, either by being aligned or overlapping with, the outer edge of the aileron 23 or 43, but it is not an absolute requirement. The mere presence of the escapelets and their action upon the airflow across the fluid dynamic body helps to transfer better control to the ailerons and other similar structures.

Figure 5:
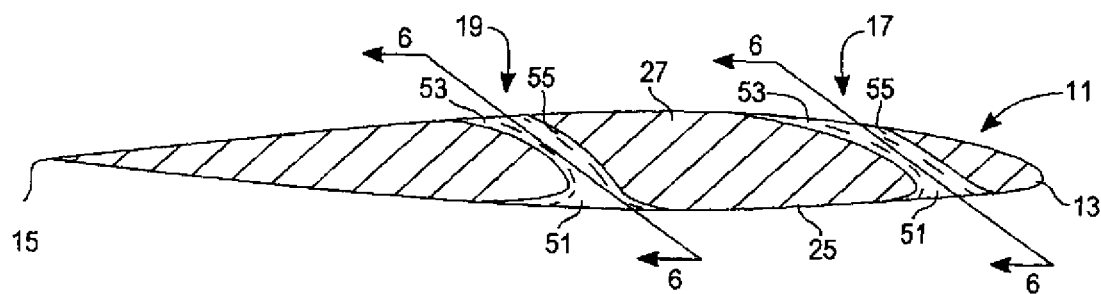
FIG. 5 is a chord-wise sectional view through an escapelet for the wing of FIGS. 3A-3C and 4A-4C.
Figure 6A:
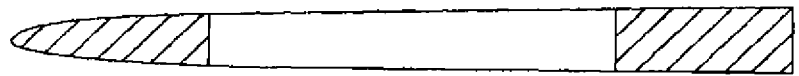
FIGS. 6A-6F are various span-wise vertical sectional views showing some different embodiments of escapelet endwalls on the aircraft's starboard wing.
Figure 6B:
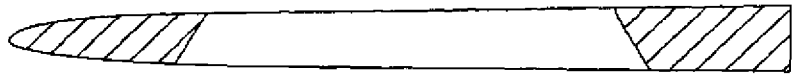
Figure 6C:
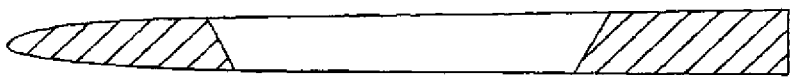
Figure 6D:
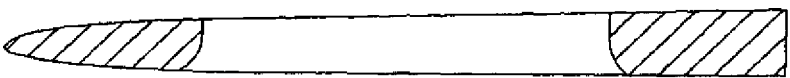
Figure 6E:
Figure 6F:
Figure 7:
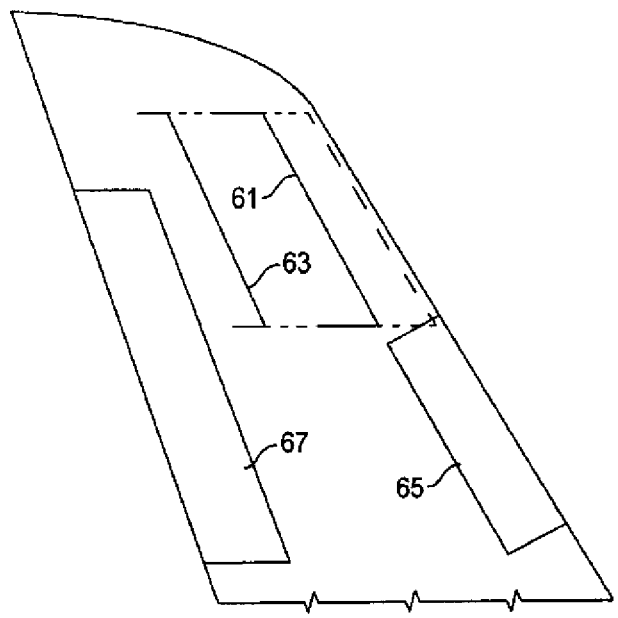
Figure 8:
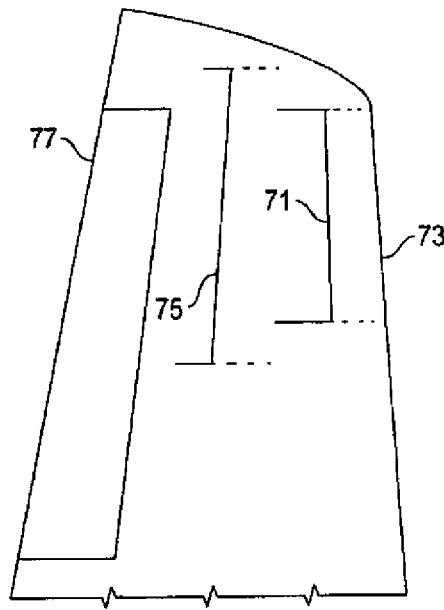
Figure 9:
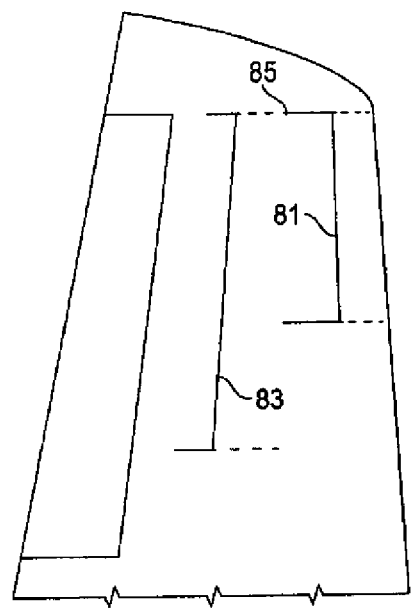
Figure 10:
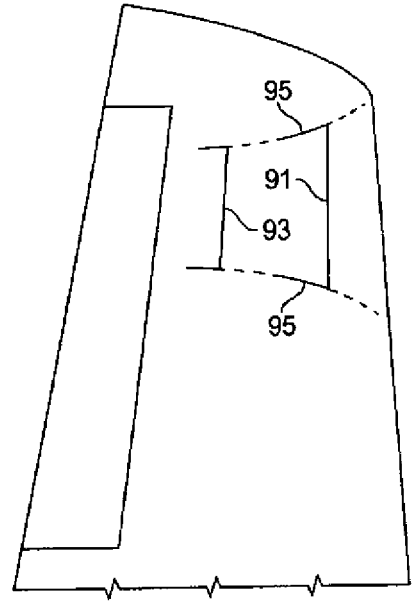
Figure 25A:
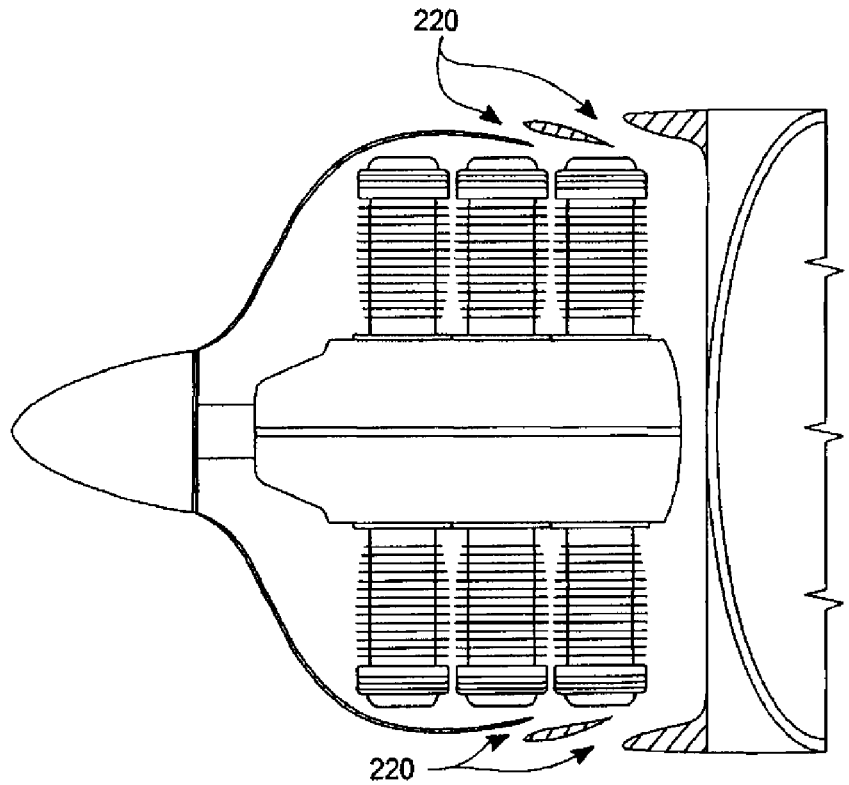
Figure 25B:
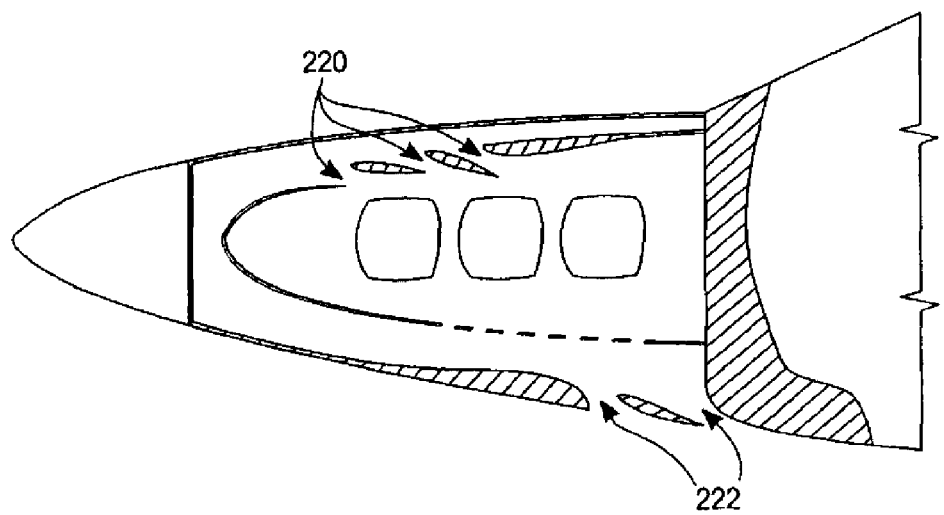

With reference to FIG. 5, a cross-section of the swept wing embodiment of FIGS. 3A-3C and 4A-4C is seen. The section for an unswept wing design would be similar. The escapelets 17 and 19 extend through the wing 11 from inlets 51 located in the lower wing surface 25 to the outlets 53 located in the upper wing surface 27. The general direction of the escapelets 17 and 19 is aft, i.e., the inlets 51 are closer to the leading edge 13, while the outlets 53 are closer to the trailing edge 15 of the wing 11. The escapelets 17 and 19 also tend to be streamlined in their shape for best performance. Fairings or fillets 55 may be inserted into the escapelet passages to eliminate any sharp edges, corners, or discontinuities in order to eliminate turbulence and interference drag. Preferred dimensions will be discussed later with respect to FIG. 14A.

As seen in FIGS. 6A-6F, the span-wise cross sections show examples of some possible choices for the inboard and outboard ends of the escapelets. These ends may be straight as in FIGS. 6A-6C or have some curvature as in FIGS. 6D-6F. The inlets and the outlets may have different spans as in FIGS. 6A-6F. Typically, a shorter outlet would often be preferred, leading to airflow acceleration within the escapelet passages, but the other choices may also be viable or even preferred in some escapelet applications, whether on wings or other surfaces.

Figure 8:
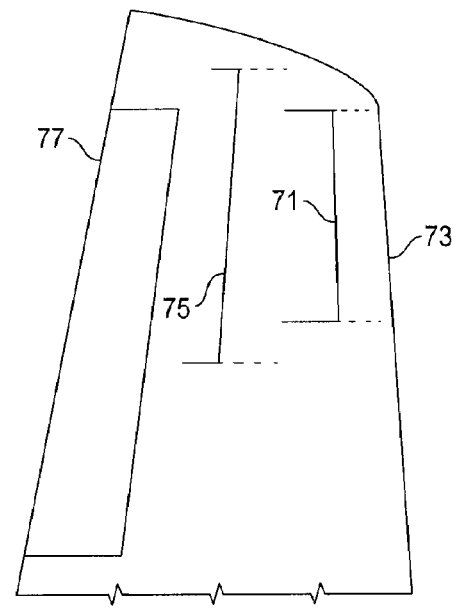
Figure 9:
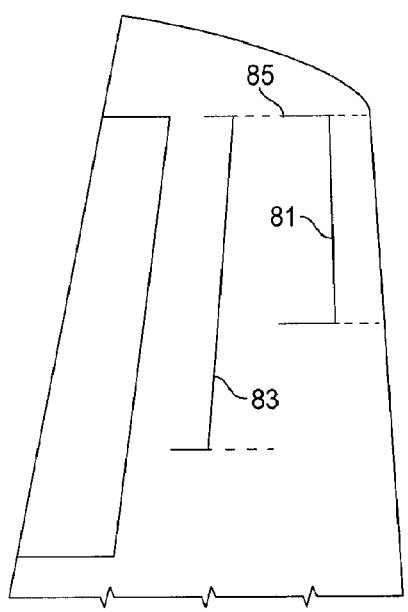
Figure 10:
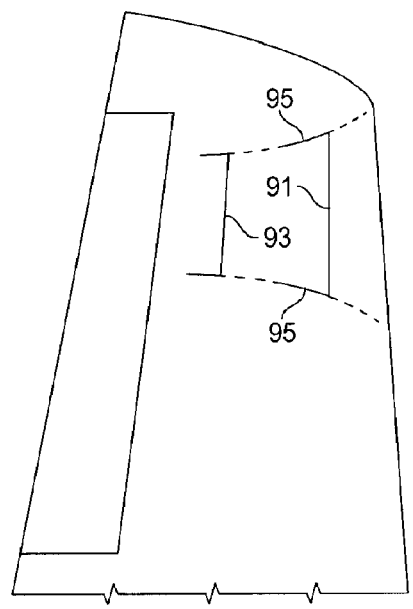

FIGS. 7-11 show a variety of possible positions for escapelets on a wing. In FIG. 7, a pair of escapelets 61 and 63 is located outboard of a leading edge slat 65, and also overlapping with the outboard of an aileron 67. In FIG. 8, a first escapelet 71 closer to a leading edge 73 is shorter in length than a second escapelet 75 closer to a trailing edge 77. Thus, the escapelets in a series need not have identical lengths. Likewise, in FIG. 9, escapelet 81 is shorter than escapelet 83. In FIG. 8, the span-wise centers of the two escapelets 71 and 75 are substantially aligned, while in FIG. 9, the outer ends of the escapelets 81 and 83 are aligned. Either embodiment or any other relative positioning of a series of escapelets could be employed. In FIG. 10, the leading escapelet 91 is longer than the trailing escapelet 93 in the series. Additionally, the respective ends of the escapelets 91 and 93 follow common contours 95. In FIG. 11, the common end contours 97 are straight, whereas in FIG. 10, the common end contours 95 are curved. Either design could be used.

While FIGS. 1-11 have focused on the outer ends of wings, near the wingtips, mainly to preempt significant formation of trailing vortices, other escapelet positions can be used. As shown in FIG. 12, in addition to the escapelets 101 found near the wingtips and/or associated with the ailerons, additional sets of escapelets 103 may be provided on one or both sides of the engine pylon mounts or may be associated with other structures attached to or part of the fluid dynamic body. Still further, escapelets 105 may be provided on the wing adjacent to the fuselage 107 to energize stagnant flow. This later positioning of escapelets helps to substantially reduce interference drag at the higher angles of attack when the aircraft is ascending, descending, or maneuvering. Additionally, they preempt or reduce the formation of vortices and/or other undesirable fluid dynamic phenomena that could interfere with the airflow over the tail section or other parts on a craft.

Figures 13A, 13B:
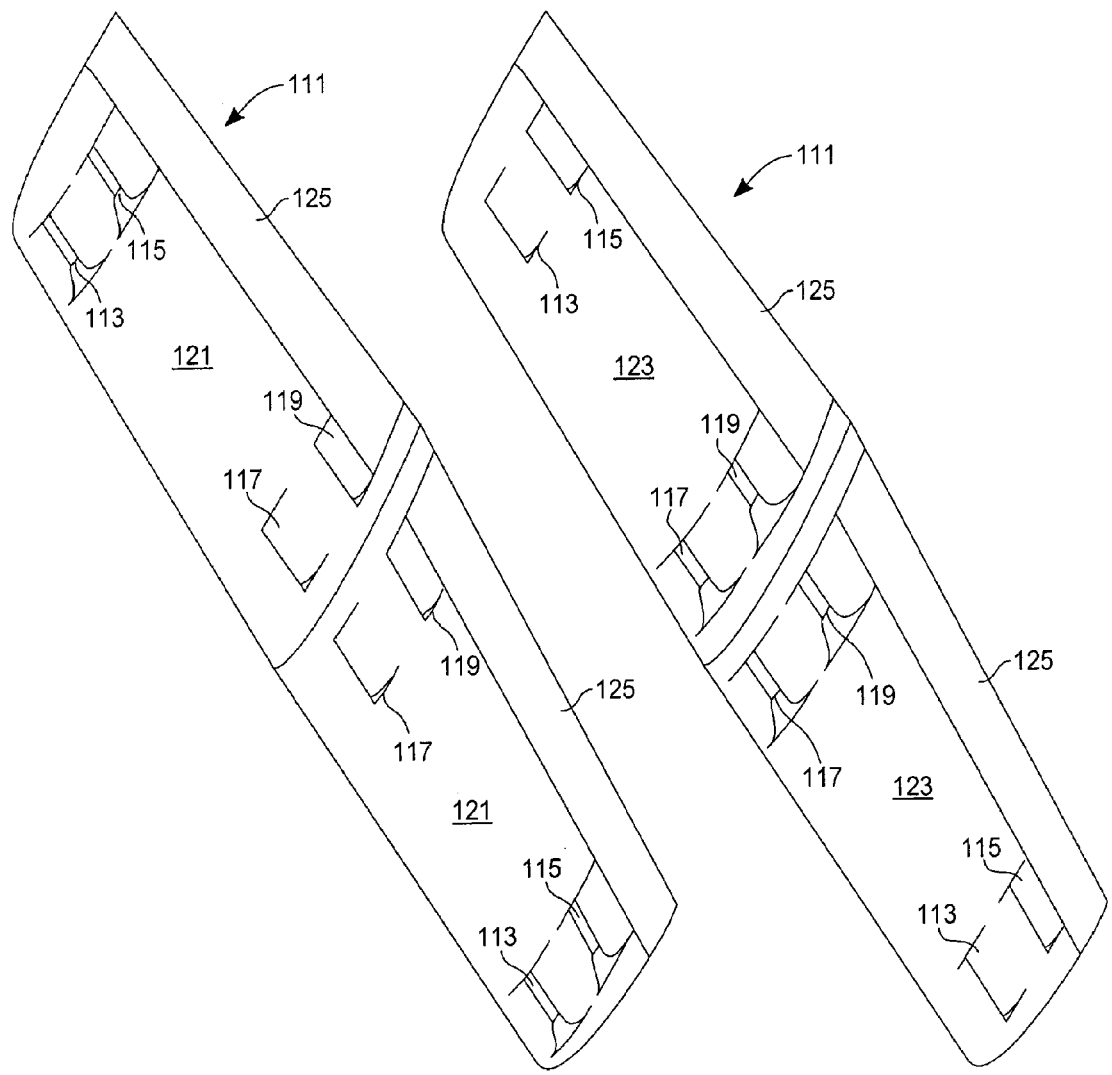
FIGS. 13A-13B are perspective views of respective upper and lower surfaces of a horizontal tail section implementing an embodiment of the present invention.

With reference to FIGS. 13A and 13B, respective upper and lower views of a horizontal tail surface 111 show that provision of escapelets, as shown at 113, 115, 117, and 119, need not be confined solely to the main wing of an aircraft, and preferably will indeed be provided on such tail surfaces. One should be reminded that horizontal tail surfaces are inverted from those of the main wing in order to provide a pitch-corrective downward force, using elevators 125 on the trailing edge as pitch control surfaces. Escapelet inlets are on the higher-pressure upper surface 121 of the horizontal tail section 111, while escapelet outlets are on the lower-pressure lower surface 123 of the horizontal tail surface 111. As in the main wing, escapelets 113 and 115 provided near the tip of the tail section preempt or reduce the formation of trailing vortices, thereby substantially reducing induced drag. While vortices from tail surfaces are not nearly as prominent as those from a main wing, they are still not insubstantial, and fuel savings can be realized by providing escapelets on these tail surfaces as well as on the main wing. Escapelets 117 and 119 located inboard near the intersection of a vertical stabilizer/rudder can help substantially to control yaw and recovery from spin situations that might occur. Additionally, escapelets can help to counter adverse yaw due to asymmetric engine thrust, as when one engine of a twin- or multi-engine aircraft fails and the remaining engines provide all of the thrust from one side of the plane. FIGS. 13A and 13B show a horizontal tail section's inboard escapelets 117 and 119 which allow energized air to reach the vertical stabilizer/rudder (not shown), providing more control to be transferred to the aircraft's rudder.

With reference to FIG. 14A, dimensions for the escapelets are generally defined relative to a local chord line (0) of the fluid dynamic body extending from the leading edge to the trailing edge, the length of which is defined as 100%. As already noted, there may be one, two, or more escapelets (1) in series spaced along the chord (0). Four escapelets (1) are seen in FIG. 14A. FIG. 14B shows that the aft-most escapelet 131 could be formed in a flight control surface 133, such as an aileron, elevator, or flap, e.g., pivoting relative to the main wing or tail section 135 about some pivot point 137. However, in most cases, the escapelets will be completely contained within the main foil contour. Escapelet outlet sizes (2) are measured normal to the aft surface (6) of the escapelet (1) from a point (5) at the trailing edge of the fore surface (7) of the escapelet (1). The outlet size (2) may range anywhere from 0.75% to 15.4% of the chord (0). Likewise, escapelet inlet (3) sizes are measured normal to the aft surface (6) of the escapelet (1) from a point of tangency of the original foil section and the escapelet fore body (7) intersection shown as point (8), to the shortest dimension to the aft escapelet body (6). The size of the inlet (3) may range anywhere from 0.85% to 40.65% of the chord (0). The escapelet (1) may either converge or diverge, as required, but generally, the outlet size (2) ranges anywhere from 10% to 110% of the inlet size (3), with the higher values in the range generally applying to craft with higher design speeds. Escapelet outlets are located downstream or aft of the escapelet inlets, with a center-of-inlet (9) to center-of-outlet (10) mean line of an escapelet oriented chord-wise at an angle ($\theta$) ranging anywhere from 10° to 80° relative to the chord line, with the lower value generally applying to craft of higher design speeds.

With reference to FIGS. 15A and 15B, the use of escapelets is not confined to fixed-wing airplanes, as in FIGS. 1 through 14, but could be applied to other fluid dynamic bodies, such as 141, and other fluid dynamic bodies, such as parachutes, hang gliders, ultra-light aircraft, work kites, recreational or emergency devices, and even toys and toy kites. As seen in FIG. 15B, a fluid dynamic body 141 of this type may have one, two, or more escapelets 143-145 located near both outer portions of the fluid dynamic body 141. By preempting or reducing the formation of vortices and ensuring proper airflow, these escapelets increase the effective aspect ratio significantly when compared to similar foil sections without such escapelets. A higher stall angle of attack and reduction of the stall speed is also a consequence of the improved airflow created by the escapelets.

With reference to FIG. 18, a foil frame 171 for placement around guy wires, cables, power lines, towers and stacks is shown. FIGS. 19A-19C show various isometric views of individual segments 173 of such a foil frame 171. Such foil frames are added to guy wires to control flutter and the wind-driven whipping action and vibration that causes fatigue and potential structure damage. The frame 171 acts to direct the wind smoothly around the guy wires. To minimize turbulence and decrease turbulence (by preventing the von Karman vortex street vortex flow), the foil frame 171 in accord with the present invention includes an escapelet 175 passing from one side of each segment 173 to the opposite side. Alternate segments 173 may have escapelets 175 and 175' directing air in opposite directions from one side to the other, as in seen in FIG. 18.

With reference to FIG. 18, foil fairings 171 for placement around structures such as guy wires, cables, power lines, poles, towers and stacks are shown with escapelets. FIGS. 19A-19C show various isometric views of individual segments 173 of such foil fairings 171. Such foil fairings are installed around guy wires to control flutter and the flow-driven whipping action and vibration that causes fatigue and potential structure damage. The frame 171 acts to direct the flow smoothly around the guy wires. To minimize turbulence (by preventing the von Karman vortex street flow), the foil fairing 171 in accord with the present invention includes an escapelet 175 passing from one side of each segment 173 to the opposite side. Alternate segments 173 may have escapelets 175 and 175' directing air to opposite sides of each individual escapelet component 173, as seen in FIG. 18.

With reference to FIGS. 20A-20B and FIG. 21, the use of escapelets can be applied to watercraft as well. Here, a boat or ship 181 having one or more wing sails 183 is seen. Each wing sail 183 may have one or more sets of escapelets 185, 187, 189, 191, etc. Preferably, both upper and lower ends of the wing sail 183 will have such modifications, with one or more sets of escapelets 185 and 187 near the top of the wing sail and one or more sets of escapelets 189 and 191 near the bottom of the wing sail. Furthermore, the escapelets are preferably organized in pairs with one set of escapelets 185 or 189 of a pair passing air through the wing sail 183 from port to starboard and another set of escapelets 187 or 191 of a pair passing air through the wing sail 183 in the opposite direction from starboard to port. This allows the full effect of the escapelets to occur no matter from which direction the wind is coming. Each wing sail 183 can be turned about its pivot axis 193 established by the respective masts 195.

Fluid dynamic structures having foil bodies containing escapelets need not be confined solely to aerodynamic structures, but can also apply to hydrodynamic structures. As seen in FIG. 22 and FIGS. 23A-23B, a ship or boat keel 201 acts as a hydrodynamic body with corresponding problems of trailing wakes and associated drag. Due to wake turbulence, the maximum hull speed is limited based on the length of the waterline. Additionally, the bow wave has erosion effects on nearby shorelines, causing speed limits to be imposed on watercraft to avoid causing a wake. The keel 201 may therefore be provided with one or more sets of escapelets 203 and 205. The sets of escapelets are installed in port and starboard sets, with a set of one or more escapelets 203 passing water or other fluid through the keel from starboard to port and another set of one or more escapelets 205 passing water or other fluid in the opposite direction through the keel, i.e., from port to starboard.

A variety of keel types can employ such escapelets. As seen in FIG. 24, a wing keel 211 has a pair of underwater wings 213 projecting outward from a vertical keel 215 and these fluid dynamic bodies provide lift to the vessel. As in aircraft wings, the underwater wings 213 are provided with one or more escapelets 217 and 219 passing water or other fluid from a higher-pressure underside of the wings 213 to a lower-pressure upper side of the wings 213. The escapelets may be positioned near the wing tips, more inboard near the vertical keel, or across nearly the entire wingspan. The vertical keel 215 might also be provided with escapelets as in FIG. 22. Other underwater structures such as hydrofoils, movable keels, dagger boards, and rudders may also advantageously be fitted with escapelets to ensure improved flow.

Figure 25A:
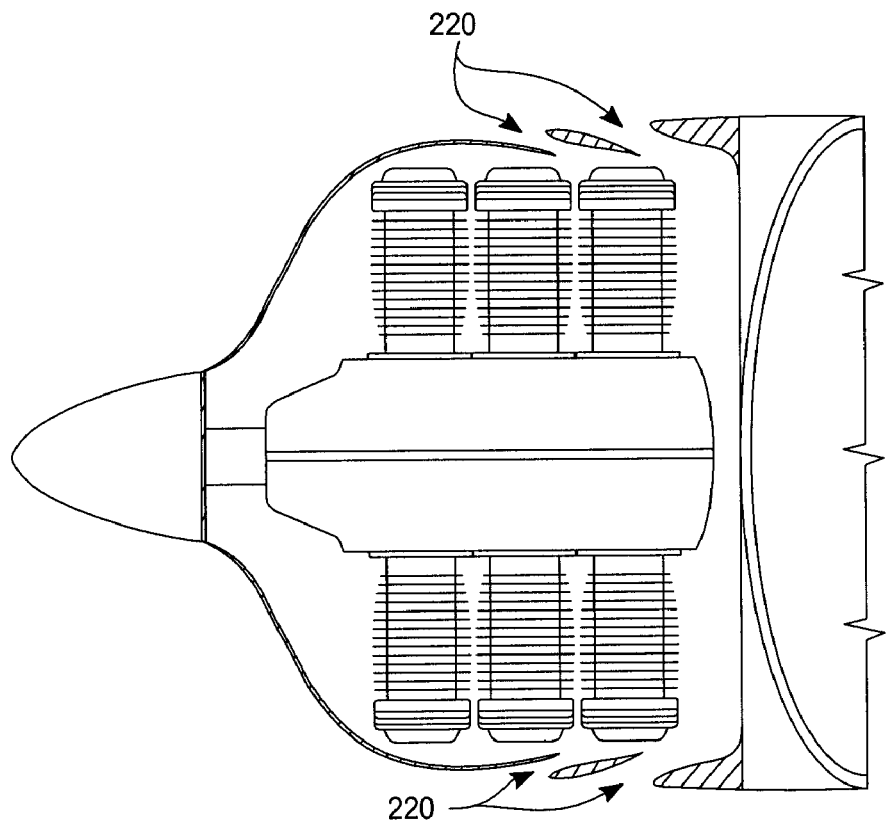
FIGS. 25A-25B are sectional views illustrating the presence of escapelets provided in a high performance cowl that houses an air-cooled engine.
Figure 25B:
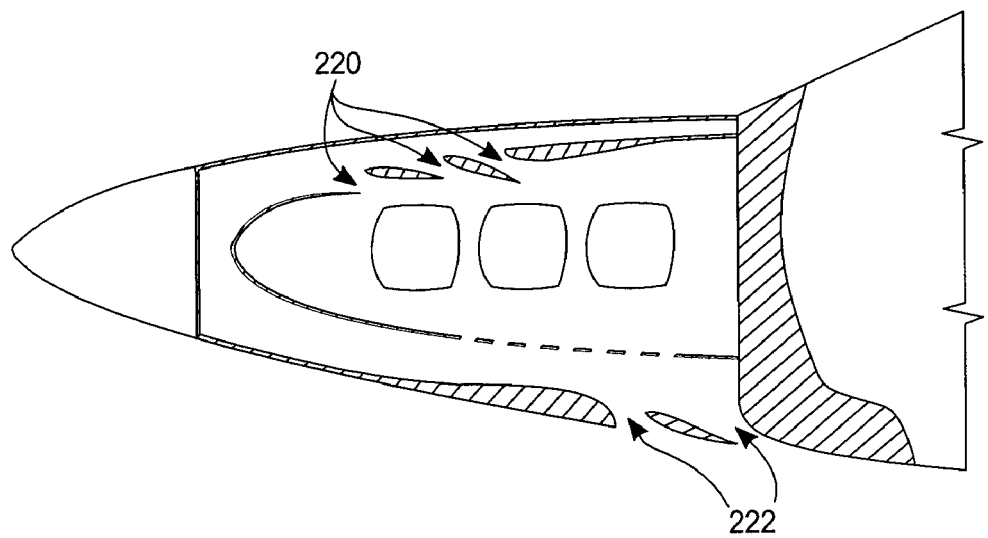

FIGS. 25A and 25B show a typical high performance cowl for housing an air-cooled engine. The cowl includes a primarily streamline flow escapelet installation with inlets 220 and outlets 222 in the walls. There may be one or more escapelets anywhere in the cowl; two per side are shown in the illustrated embodiment. By increasing airflow through the cowl and reducing drag, the escapelets have the added benefit of improving the cooling efficiency of the cowl. Escapelets inlets 220 are located in areas of the cowling walls where relatively higher pressure air is expected during normal operation, while escapelet outlets 222 are located in areas of the cowling walls where relatively lower pressure air is expected during normal operation, so that air flow through the cowl is enhanced by the pressure differential between inlets 220 and outlets 222. The pressure of the escapelet inlets provides cooling air to the engine within the cowl, while the presence of the escapelet outlets improve extraction of the warmed air.

Tests were devised to demonstrate and measure the effectiveness of the escapelets. Several glider models were built for early evaluation. The results were very favorable, so large-scale radio-controlled models were built for quantitative tests and measurements. The models were built such that the wing tips were interchangeable, having the same planform, weight and center of gravity location, but with and without escapelets. For documented flight testing, each of three large-scale models as above were flight tested as follows: each test was conducted over a realistic and controlled sequence of conditions from takeoff to level flight at specified cruising speeds to landing, with and without the escapelets. It is notable that introduction of the escapelets did not require any trim control adjustments to maintain level hands off flight. Each flight test sequence was repeated several times, and the results were averaged.

To assure the veracity of the data collected in the test flights, a standard flight profile was developed to be followed for each test. Comparative flights with and without escapelets were conducted immediately following each other to reduce the effects of any changes in the atmospheric conditions. All times were recorded with a stopwatch. Some of the flights equipped with escapelets ran a few seconds longer than standard flights with the unmodified aircraft, and all fuel measurements were taken with a digital scale. Fuel burn was measured to the nearest gram. Then, fuel consumption comparisons were made. The data from each vehicle below is an average of all of the flights of that vehicle. The test flight profile was as follows:

1) Start, radio check, taxi, hold (2 minutes)
2) Takeoff
3) Fly one lap around field at full power
4) Reduce to cruise power
5) Time lap speed and fly several laps in a racetrack pattern
6) Land, taxi, stop
7) Accurately measure weight of fuel required to refill tank Test One Results The recorded flight speed for this test series was an average of 50 mph, and the coefficient of lift (CL) was calculated to be 0.25.

Conditions:
    Wind: 0-5 mph gusting
    Temperature: 68° F.
    Barometric Pressure: 29.92 in Hg
Standard Flight (without Escapelets):
    Duration: 900 seconds
    Fuel Burn: 107 grams
Modified Flight (Equipped with Escapelets):
    Duration: 900 seconds Fuel Burn: 93 grams
Fuel Savings, %:
 12.54% total flight
 16.99% cruise
Test Two Results
 The recorded flight speed for this test series was an average of 60 mph, and the coefficient of lift (CL) was calculated to be 0.5.
Conditions:
 Wind: 0-2 mph
 Temperature: 27° F.
 Barometric Pressure: 29.92 in Hg
Standard Flight (without Escapelets):
 Duration: 606 seconds
 Fuel Burn: 178 grams
Modified Flight (Equipped with Escapelets):
 Duration: 606 seconds—adjusted from 616 seconds
 Fuel Burn: 138.71 grams—adjusted from 141 grams
Fuel Savings, %:
 22.08% total flight
 29.92% cruise
Test Three Results
 The recorded flight speed for this test series was an average of 78 mph, and the coefficient of lift (CL) was calculated to be 0.3.
Conditions;
 Wind: 0-2 mph
 Temperature: 82.6° F.
 Barometric Pressure: 29.82 in Hg
Standard Flight (without Escapelets):
 Duration: 509 seconds
 Fuel Burn: 228 grams
Modified Flight (Equipped with Escapelets):
 Duration: 509 seconds—adjusted from 515 seconds
 Fuel Burn: 192.7 grams—adjusted from 195 grams
Fuel Savings, %:
 15.48% total flight
 20.98% cruise
 These fuel savings results correspond to a drag reduction, varying from 25% to 50%, depending on the lift coefficient.

What is claimed is:

1. A fluid dynamic body configured to move through a fluid; wherein the fluid is a liquid or a gas, said fluid dynamic body comprising:
 a foil-shaped body having a thickness, a chord direction and a span dimension, said foil-shaped body having at least one passage therethrough, said at least one passage being formed as an escapelet leading from an inlet in a first higher pressure surface of said foil-shaped body to an outlet in a second lower pressure surface of said foil-shaped body, an inner surface of said escapelet being specifically contoured so as to provide primarily streamlined laminar flow through the at least one passage, said escapelet having a thickness, a chord direction and a span dimension defined by contoured endwalls at each spanwise end thereof, said endwalls effective for directing momentum of a mass fluid flow exiting from said escapelet,
 said outlet being located downstream of said inlet with a center-of-inlet to center-of-outlet mean line oriented at an angle ranging anywhere from 10° to 80° with respect to a chord line of said foil-shaped body, said outlet being directed streamwise,
 said inlet with an inlet measure of at least 0.85% of a local chord length of said foil-shaped body and said outlet with an outlet measure of at least 0.75% of said local chord length, said outlet having a size in a range from 10% to 110% of a size of said inlet,
 said outlet of the escapelet being contoured and positioned such that the mass fluid flow exiting in a streamwise direction from the escapelet redirects spanwise fluid flow over the foil-shaped body toward a less spanwise and more streamwise direction, thereby energizing stagnant flow in various areas and reducing induced and interference drag and also thereby reducing vortex generation, so as to improve control, and reduce energy and fuel consumption by maintaining improved flow over the surfaces of the foil-shaped body thus preempting undesirable flows that create higher drag and loss of control.

2. The fluid dynamic body of claim 1, further comprising support ribs, wherein said escapelet is located between or around said support ribs.

3. The fluid dynamic body of claim 1, wherein said escapelet includes at least one fairing to further reduce any sharp edges, corners, or discontinuities in order to reduce turbulence and drag.

4. The fluid dynamic body of claim 1, wherein said foil-shaped body comprises a wing.

5. The fluid dynamic body of claim 1, wherein said foil-shaped body comprises an empennage.

6. The fluid dynamic body of claim 1, wherein said foil-shaped body comprises a fluid dynamic control surface.

7. The fluid dynamic body of claim 6, wherein said fluid dynamic control surface comprises ailerons, flaps, canards, stabilizers, elevators, fins, and rudders.

8. The fluid dynamic body of claim 1, wherein said foil-shaped body comprises any one of a blade of a rotor, helicopter, propeller, wind turbine, turbofan, ducted fan, or wind tunnel drive fan.

9. The fluid dynamic body of claim 1, wherein said fluid dynamic body comprises a watercraft sail or a wing sail.

10. The fluid dynamic body of claim 1, wherein said fluid dynamic body comprises any one or more of hydrofoil, watercraft keel, wing keel, movable keel, dagger board, and rudder.

11. The fluid dynamic body of claim 1, wherein said fluid dynamic body comprises any one of a parachute, hang glider, ultra-light aircraft, work kite, recreational or emergency device, toy or toy kite.

12. The fluid dynamic body of claim 1, wherein said escapelet encloses or is an element of a structure such as cables, guy wires, poles, power lines, towers and stacks.

13. The fluid dynamic body of claim 1, wherein said escapelet includes at least one fillet to further reduce any sharp edges, corners, or discontinuities in order to reduce turbulence and drag.

14. A fluid dynamic body configured to move fluid or move through a fluid, wherein the fluid is a liquid or a gas, said fluid dynamic body comprising:
 a structure having a height, length and width, said structure having at least one passage therethrough, said at least one passage being formed as an escapelet leading from an inlet in a first higher pressure surface of said structure to an outlet in a second lower pressure surface of said structure, an inner surface of said escapelet being specifically contoured so as to provide primarily streamlined laminar flow through the at least one passage, said escapelet having a height, length and a width limited by contoured endwalls at each end of said escapelet effective for directing the momentum of a mass fluid flow exiting from said escapelet, said escapelet being contoured and positioned to conform to the shape of said structure, said outlet being located downstream of said inlet with a center-of-inlet to center-of-outlet mean line oriented at an angle ranging anywhere from 10° to 80° with respect to a body length, said outlet being directed streamwise, said escapelet having an inlet measure of at least 0.85% of a local length of said structure and an outlet measure of at least 0.75% of said local structure length, said outlet having a size in a range from 10% to 110% of a size of said inlet, said outlet of the escapelet being contoured and positioned such that the mass fluid flow exiting in a streamwise direction from the escapelet redirects widthwise fluid flow over the structure toward a more streamwise direction, thereby energizing stagnant flow and reducing interference drag, redirecting fluid flow efficiently along surfaces of said structure, so as to reduce turbulence and undesirable flows, improving flow control, and reduce energy consumption by maintaining improved flow over the surfaces of said structure thus preempting undesirable flows that create higher drag and loss of control.

15. The fluid dynamic body of claim 14, wherein said escapelet is a constituent of a cowl of an engine.

16. The fluid dynamic body of claim 14, wherein said escapelet is a constituent of a device for reducing cooling or ventilating drag.

17. The fluid dynamic body of claim 14, further comprising support structures, wherein said escapelet is located between or around said support structures.

18. The fluid dynamic body of claim 14, wherein said escapelet includes at least one fairing to further reduce any sharp edges, corners, or discontinuities in order to reduce turbulence and drag.

19. The fluid dynamic body of claim 14, wherein said structure comprises a fluid dynamic control surface.

20. The fluid dynamic body of claim 14, wherein said escapelet includes at least one fillet to further reduce any sharp edges, corners, or discontinuities in order to reduce turbulence and drag.

* * * * *

UNITED STATES PATENT AND TRADEMARK OFFICE
CERTIFICATE OF CORRECTION

PATENT NO. : 8,651,813 B2
APPLICATION NO. : 12/474510
DATED : February 18, 2014
INVENTOR(S) : Long It is certified that error appears in the above-identified patent and that said Letters Patent is hereby corrected as shown below:

Please delete patent 8,651,813 in its entirety and insert patent 8,651,813 in its entirety as shown on the attached pages.

Signed and Sealed this
Twenty-eighth Day of October, 2014

Michelle K. Lee
*Deputy Director of the United States Patent and Trademark Office*

(12) United States Patent
Long

(10) Patent No.: US 8,651,813 B2
(45) Date of Patent: *Feb. 18, 2014

(54) FLUID DYNAMIC BODY HAVING ESCAPELET OPENINGS FOR REDUCING INDUCED AND INTERFERENCE DRAG, AND ENERGIZING STAGNANT FLOW

(75) Inventor: Donald James Long, San Jose, CA (US)

(73) Assignee: Donald James Long, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/474,510

(22) Filed: May 29, 2009

(65) Prior Publication Data

US 2010/0303634 A1   Dec. 2, 2010

(51) Int. Cl.
   F01D 5/12   (2006.01)
(52) U.S. Cl.
   USPC ............................................... 416/90 A
(58) Field of Classification Search
   USPC ........................... 416/90 A, 90 R, 91
   See application file for complete search history.

(56) References Cited

U.S. PATENT DOCUMENTS

| | | | |
|---|---|---|---|
| 2,041,786 A | | 5/1936 | Stalker |
| 2,135,887 A | * | 11/1938 | Fairey ............................ 416/23 |
| 2,160,323 A | * | 5/1939 | Barnett ...................... 416/231 R |
| 2,237,275 A | | 4/1941 | Koppen |
| 2,407,223 A | * | 9/1946 | Caldwell ..................... 123/41.65 |
| 2,507,611 A | | 5/1950 | Pappas et al. |
| 2,571,304 A | | 10/1951 | Stalker |
| 2,587,359 A | | 2/1952 | Milans |
| 2,597,663 A | | 5/1952 | Michard |
| 2,842,214 A | * | 7/1958 | Prewitt ............................ 416/39 |
| 3,208,693 A | | 9/1965 | Riedler et al. |
| 3,363,859 A | | 1/1968 | Watts |
| 3,604,661 A | * | 9/1971 | Mayer, Jr. ......................... 244/207 |
| 3,776,170 A | * | 12/1973 | Slemmons ..................... 114/102.13 |
| 3,845,918 A | | 11/1974 | White, Jr. |
| 3,897,029 A | | 7/1975 | Calderon |
| 4,109,885 A | * | 8/1978 | Pender ............................... 244/7 R |
| 4,478,380 A | | 10/1984 | Frakes |
| 4,641,799 A | | 2/1987 | Quast et al. |
| 4,664,345 A | | 5/1987 | Lurz |
| 4,671,473 A | * | 6/1987 | Goodson ........................... 244/199.4 |
| 4,832,571 A | * | 5/1989 | Carrol .............................. 416/132 B |
| 4,860,680 A | | 8/1989 | Faulconer |
| 5,039,032 A | | 8/1991 | Rudolph |
| 5,255,881 A | | 10/1993 | Rao |

(Continued)

FOREIGN PATENT DOCUMENTS

GB   WO2007007108 A1   1/2007

*Primary Examiner* — Edward Look
*Assistant Examiner* — Liam McDowell
(74) *Attorney, Agent, or Firm* — Thomas Schneck; Mark Protsik

(57) ABSTRACT

A fluid dynamic body provides one or more fixed size escapelets through a foil body to reduce the induced and interference drag caused by trailing vortices and similar wake turbulence. The escapelets, which can be provided in both aerodynamic and hydrodynamic structures, such as wings, tail sections; rotary blades, guy wire frames, wing sails, and various underwater keels and wing keels. The escapelets transfer energy from an inlet located in the high-pressure surface of the foil or foil body to an outlet located in the lower-pressure surface, allowing energy that would normally form a vortex at the tip of the foil to be redirected and dissipated in a beneficial way. As a result, drag is reduced and fuel economy is increased. For example, in aircraft, escapelets can increase the authority of ailerons and similar flight control surfaces, allowing aircraft that were not previously spin recovery rated to become spin recoverable.

20 Claims, 13 Drawing Sheets

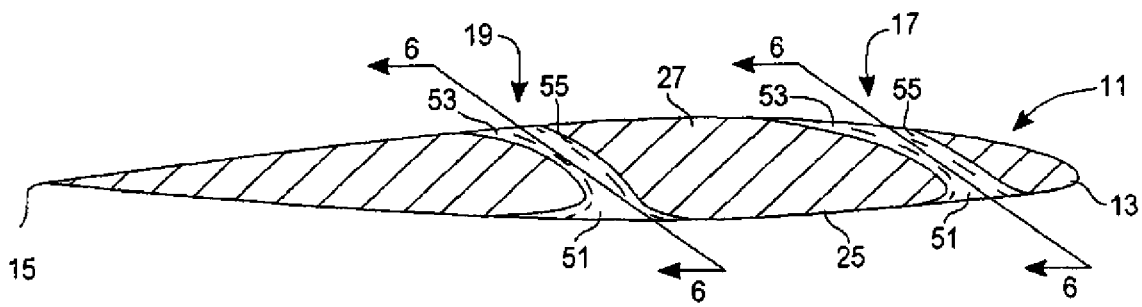

(56) References Cited

U.S. PATENT DOCUMENTS

| | | |
|---|---|---|
| 5,374,013 A | 12/1994 | Bassett et al. |
| 5,381,988 A * | 1/1995 | Kattas .................. 244/153 A |
| 5,549,260 A | 8/1996 | Reed, III |
| 5,634,613 A | 6/1997 | McCarthy |
| 5,788,190 A | 8/1998 | Siers |
| 5,791,875 A | 8/1998 | Ngo |
| 5,806,807 A | 9/1998 | Haney |
| 5,823,480 A | 10/1998 | LaRoche |
| 5,915,651 A | 6/1999 | Asaki et al. |
| 6,293,497 B1 | 9/2001 | Kelley-Wickemeyer et al. |
| 6,328,265 B1 | 12/2001 | Dizdarevic |
| 6,435,815 B2 * | 8/2002 | Harvey et al. .............. 415/115 |
| 6,622,973 B2 * | 9/2003 | Al-Garni et al. .............. 244/206 |
| 6,722,615 B2 | 4/2004 | Heller et al. |
| 6,866,233 B2 | 3/2005 | Patel et al. |
| 6,892,988 B2 | 5/2005 | Hugues |
| 6,905,092 B2 | 6/2005 | Somers |
| 7,048,235 B2 | 5/2006 | McLean et al. |
| 7,100,875 B2 | 9/2006 | Shmilovich et al. |
| 7,134,631 B2 | 11/2006 | Loth |
| 7,150,434 B1 | 12/2006 | Bandyopadhyay |
| 7,281,900 B2 * | 10/2007 | Zientek .............. 416/231 B |
| 7,490,573 B1 * | 2/2009 | Dickinson .............. 114/248 |
| 2005/0207895 A1 * | 9/2005 | Dunn .............. 416/231 R |
| 2007/0034746 A1 | 2/2007 | Shmilovich et al. |
| 2007/0252047 A1 | 11/2007 | Pal |
| 2008/0232973 A1 * | 9/2008 | Ferman .............. 416/236 R |

* cited by examiner

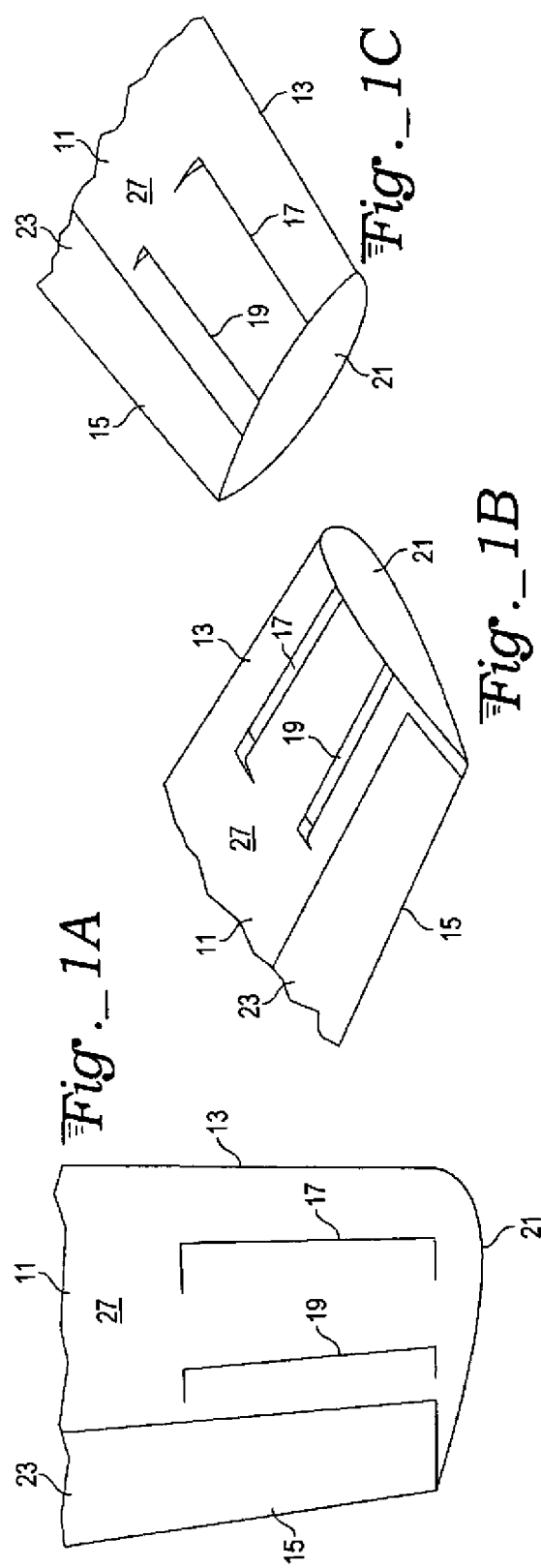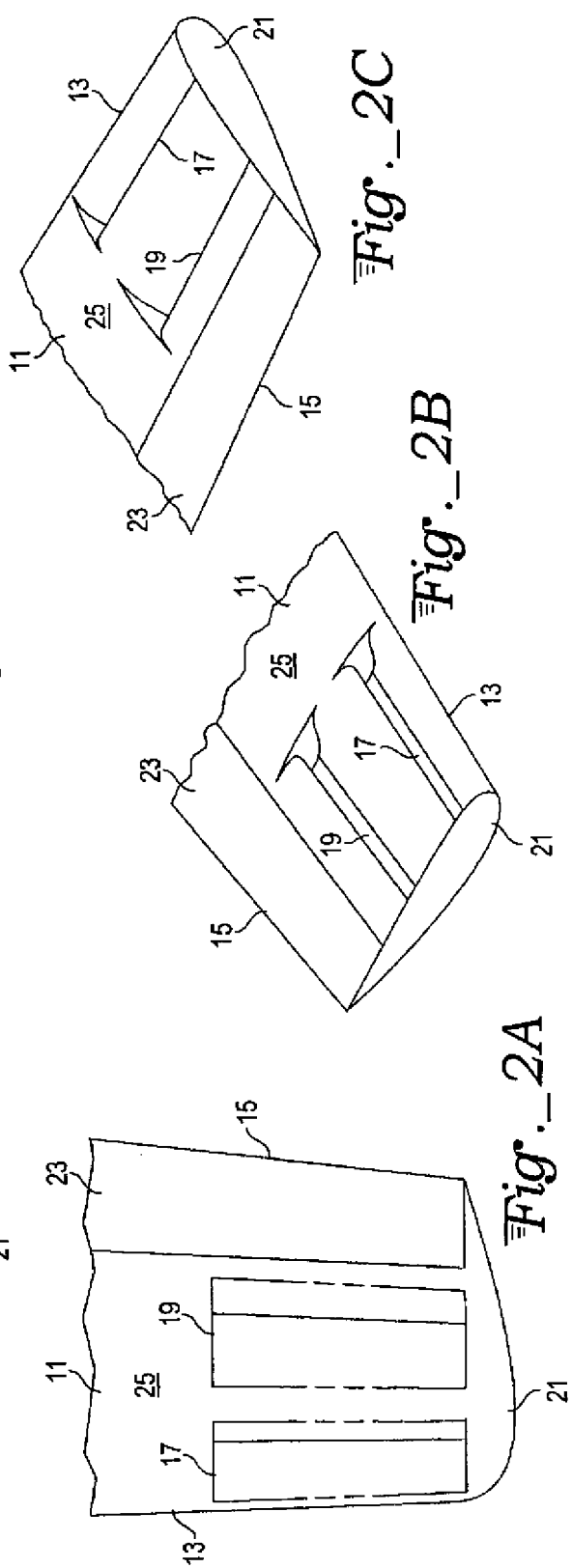

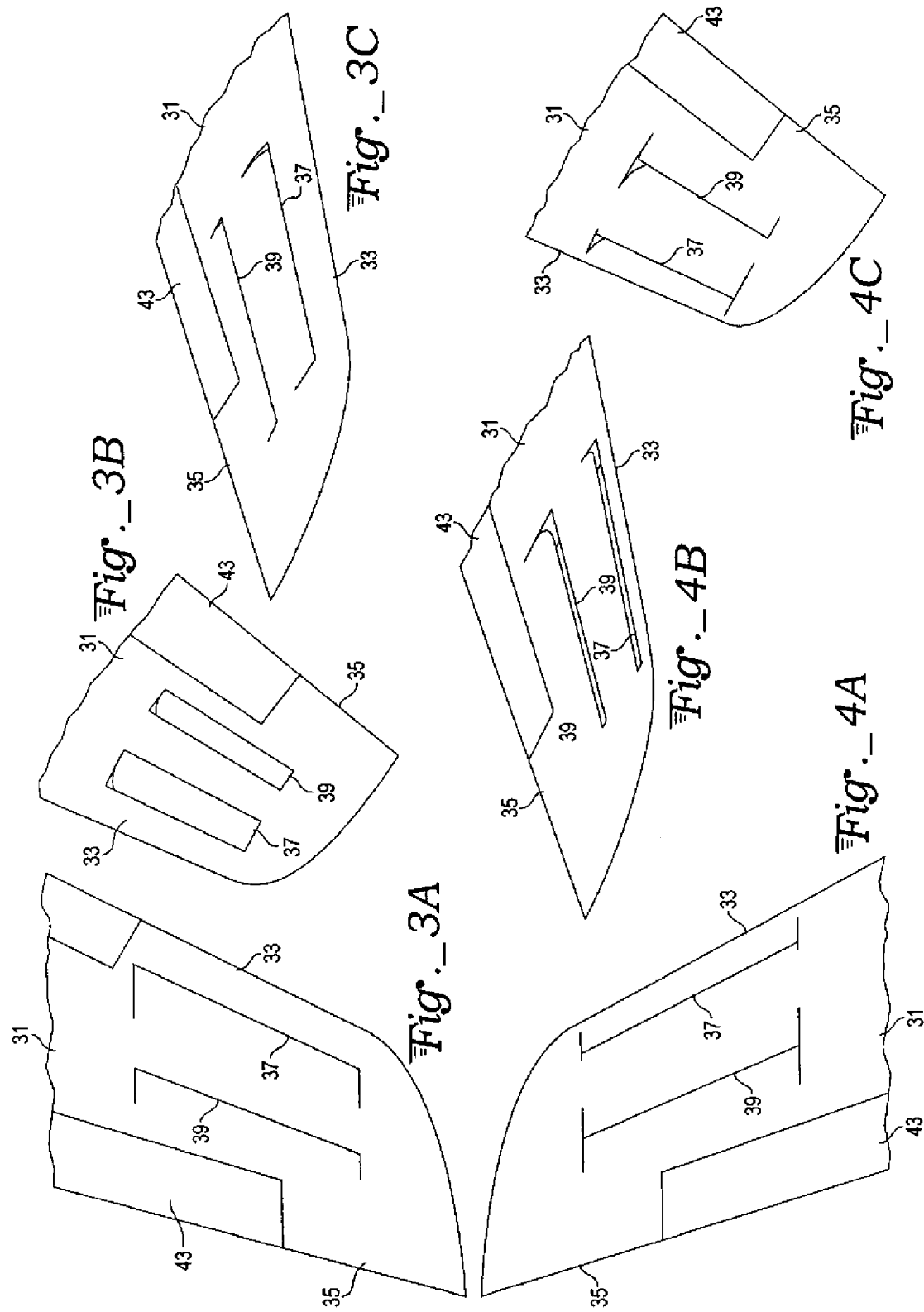

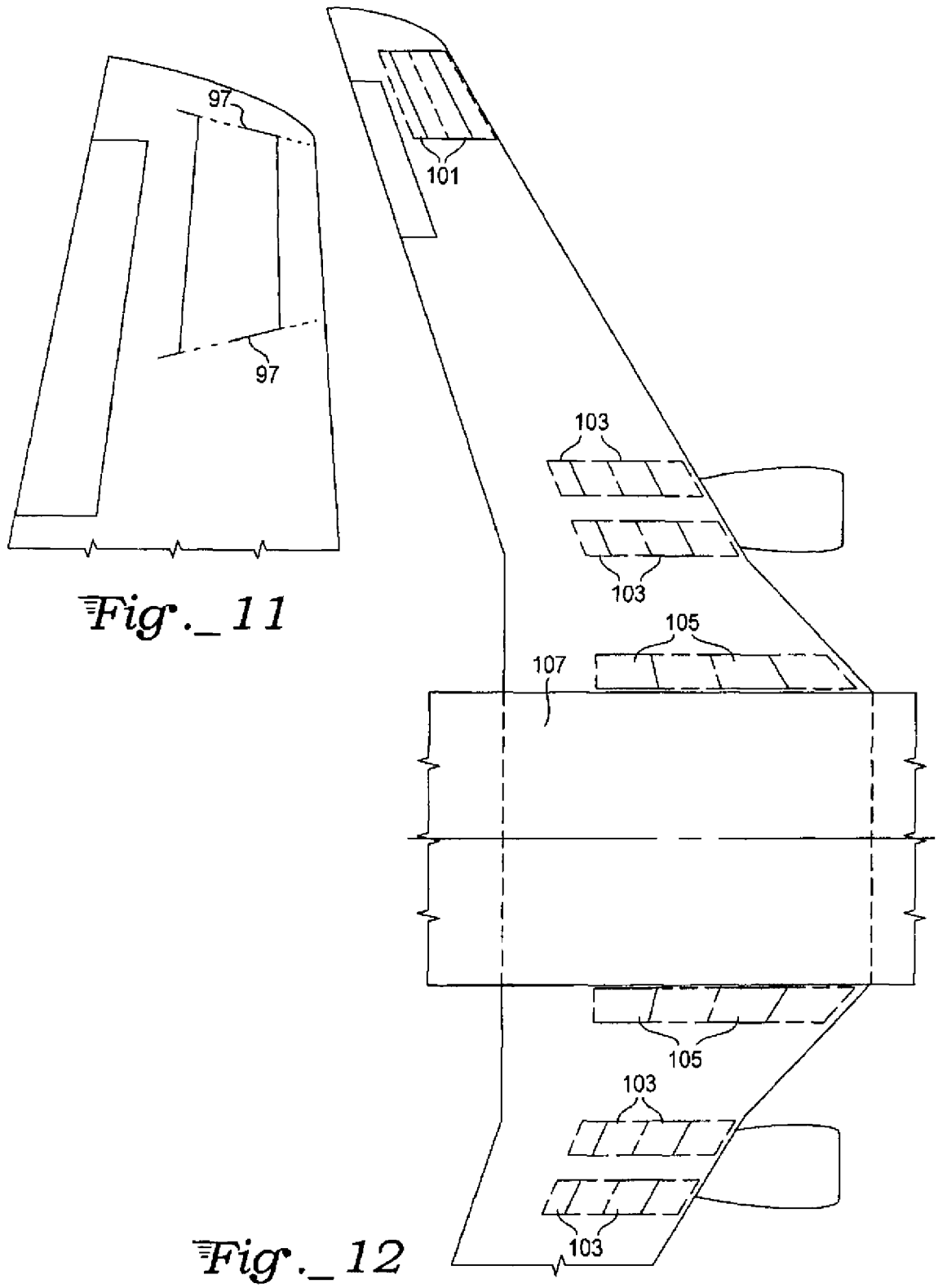
Fig._11
Fig._12

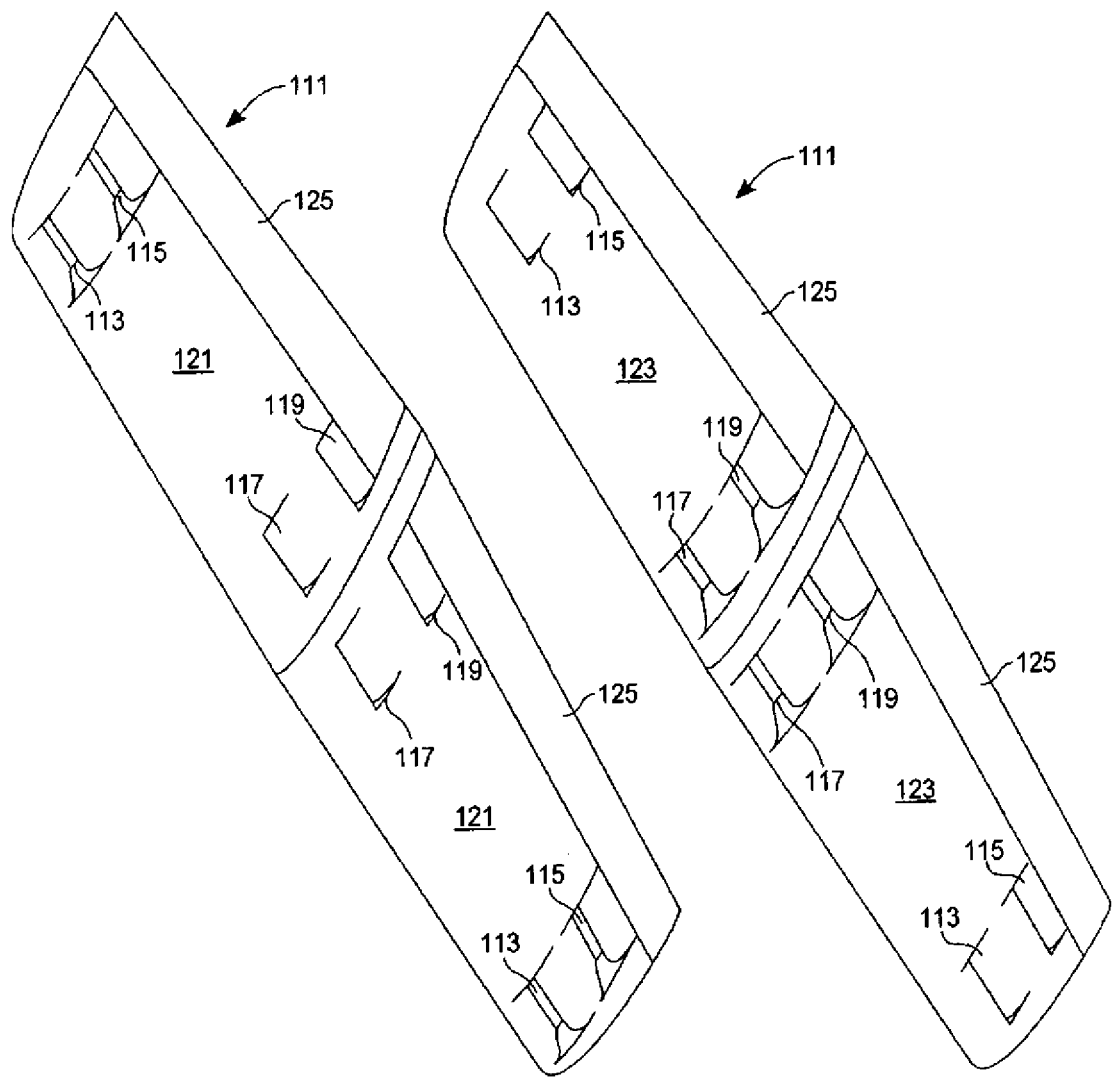

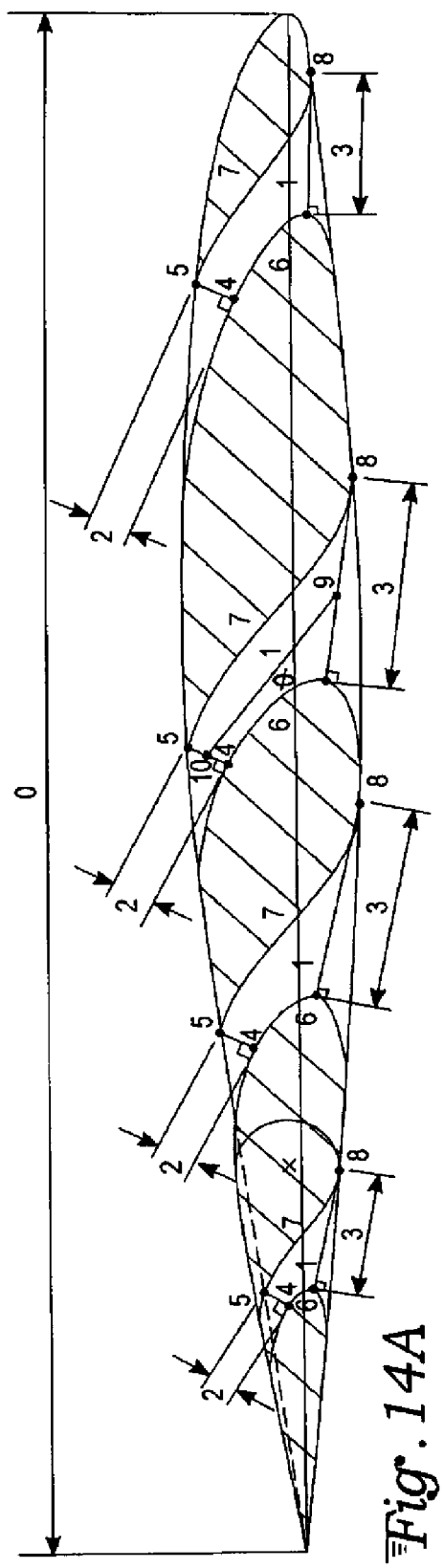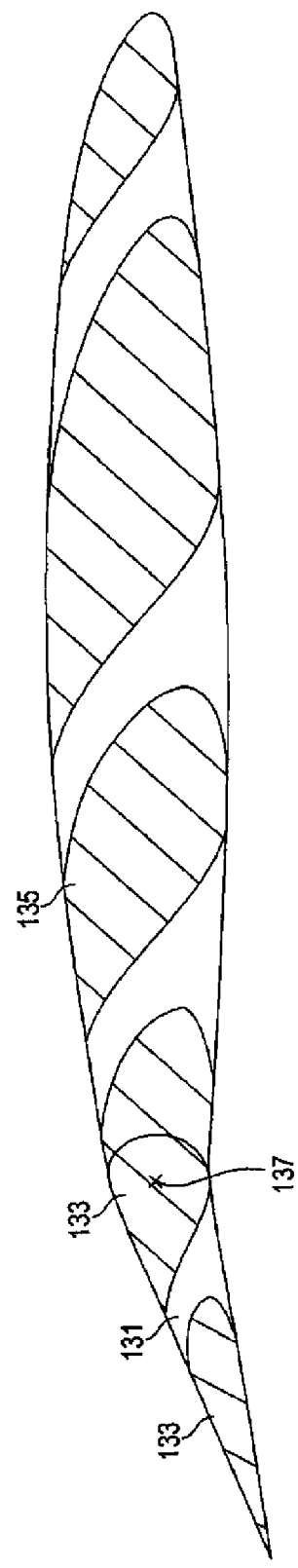
Fig. 14A
Fig. 14B

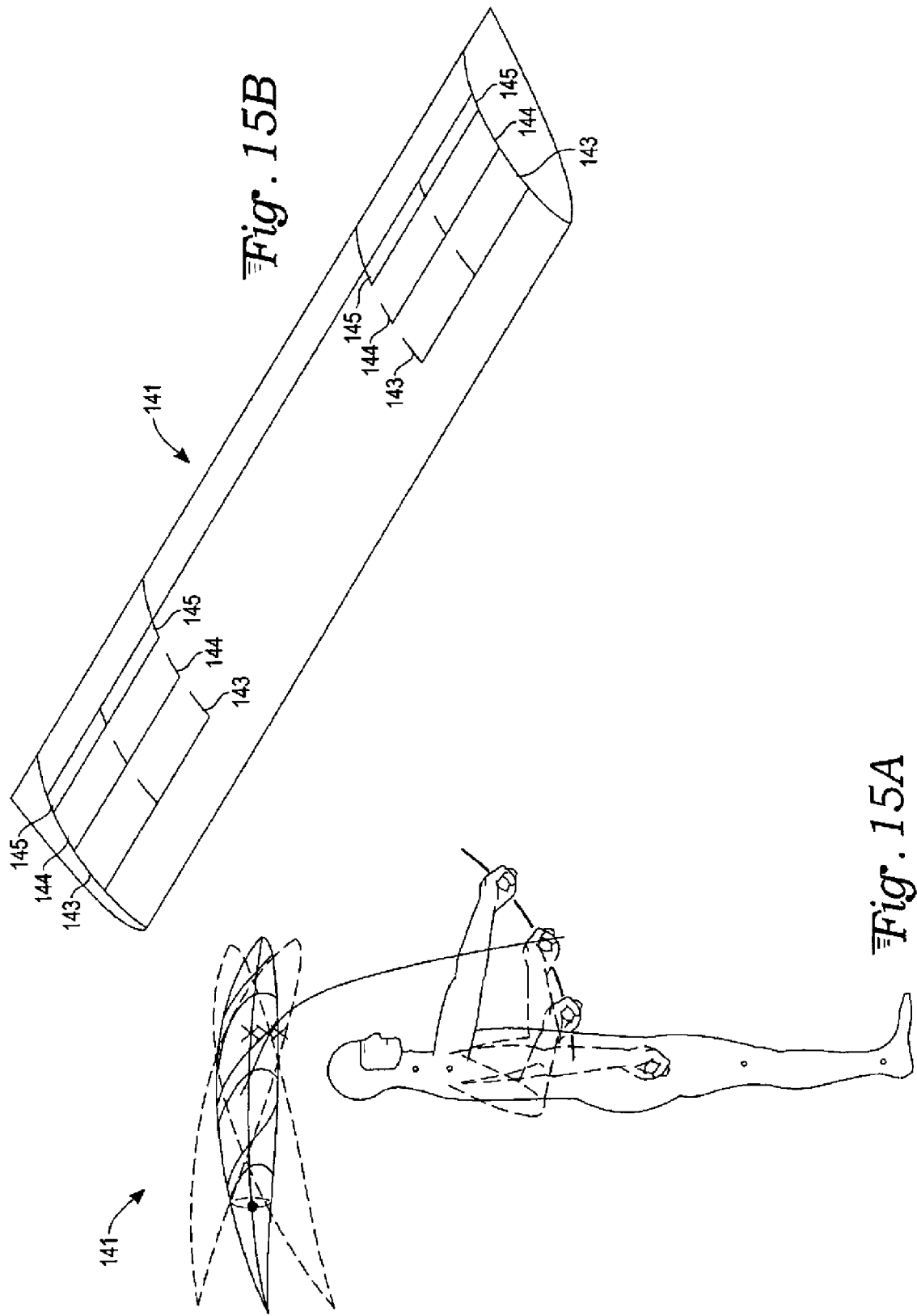

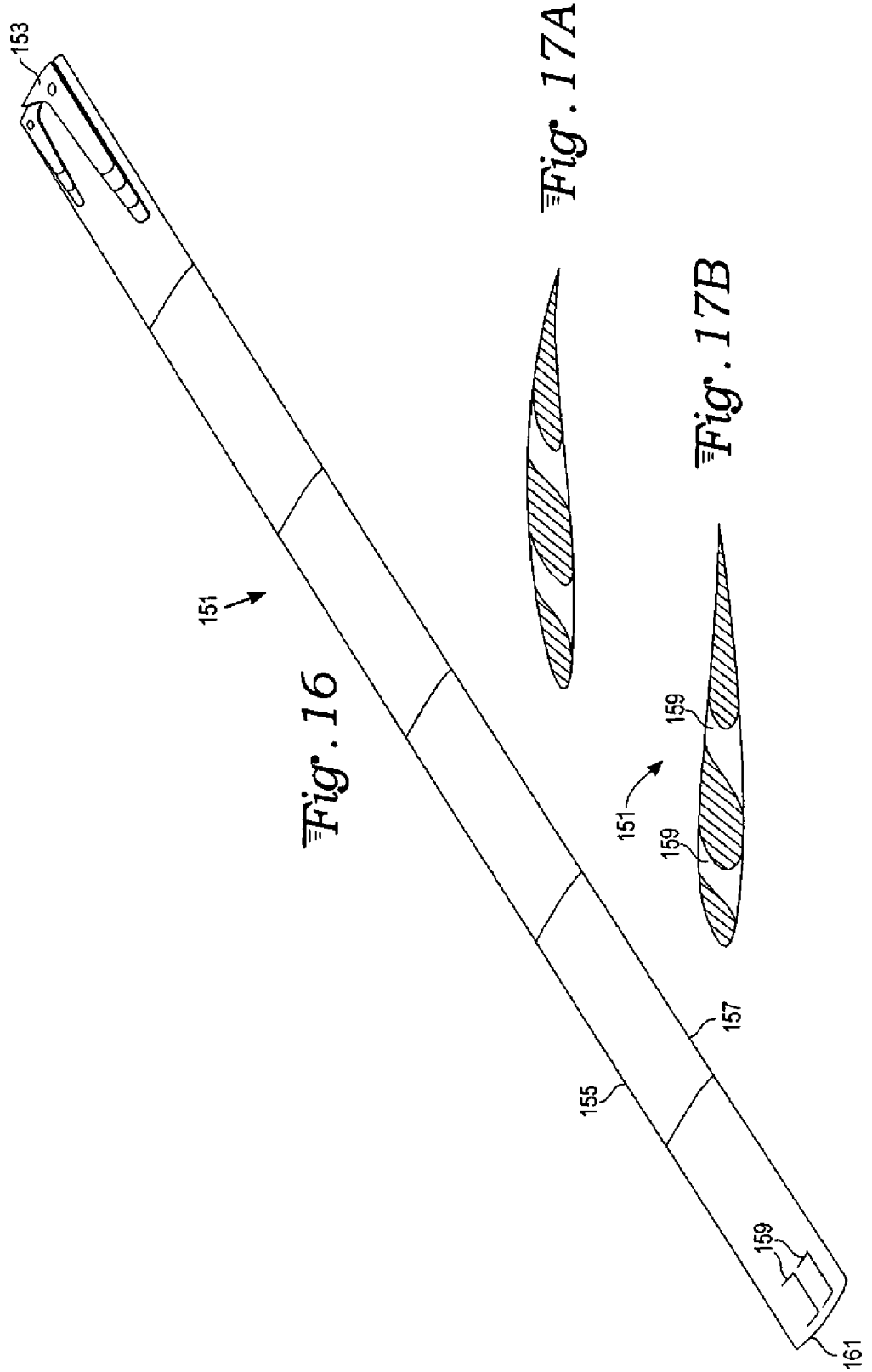

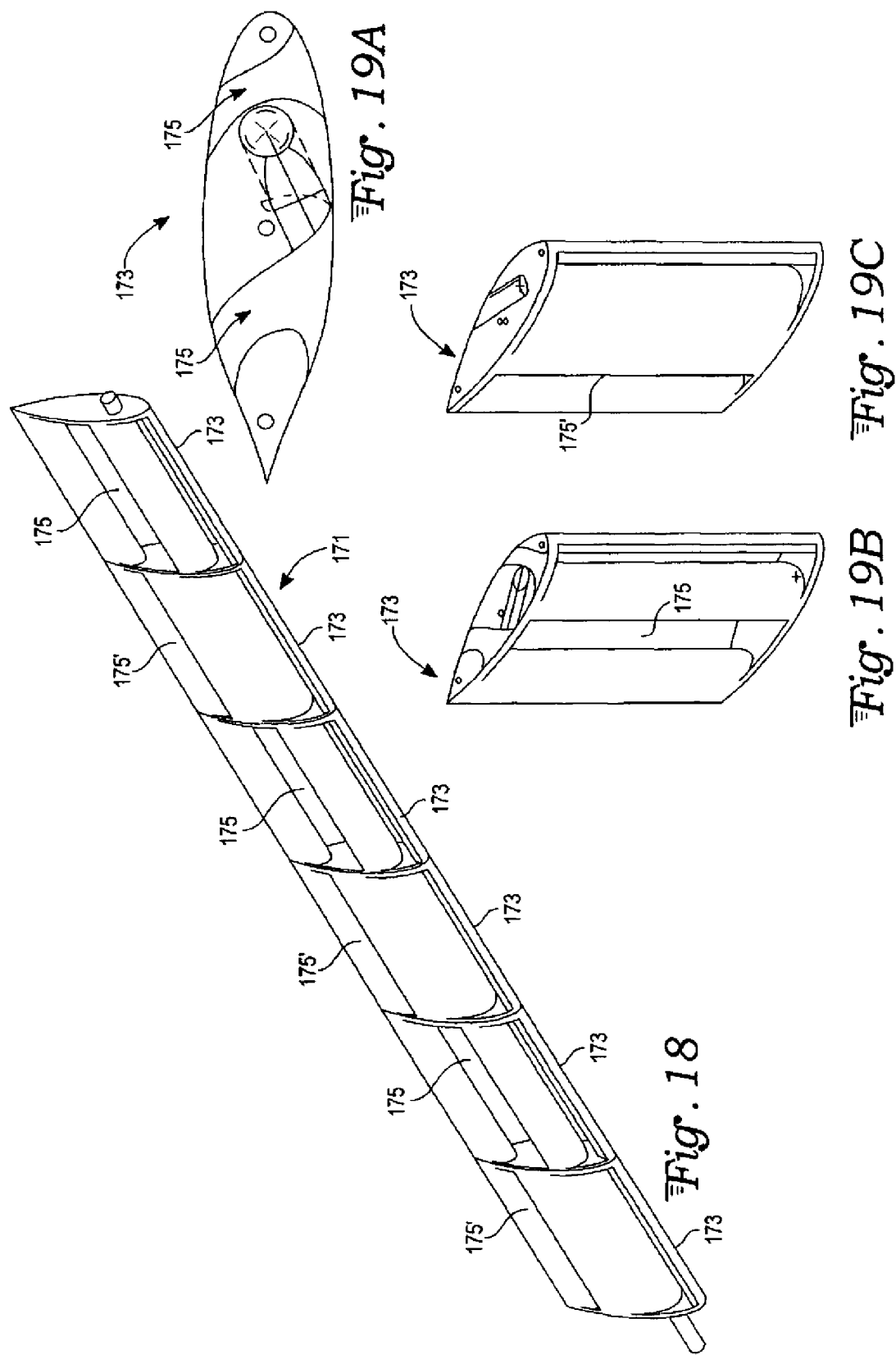

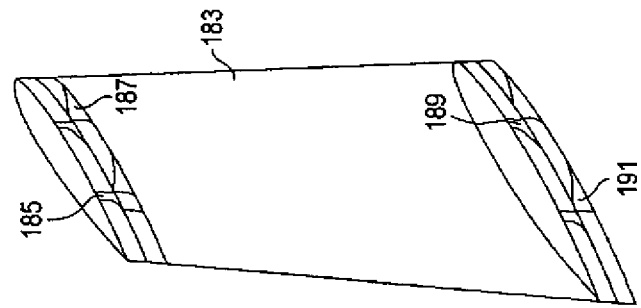
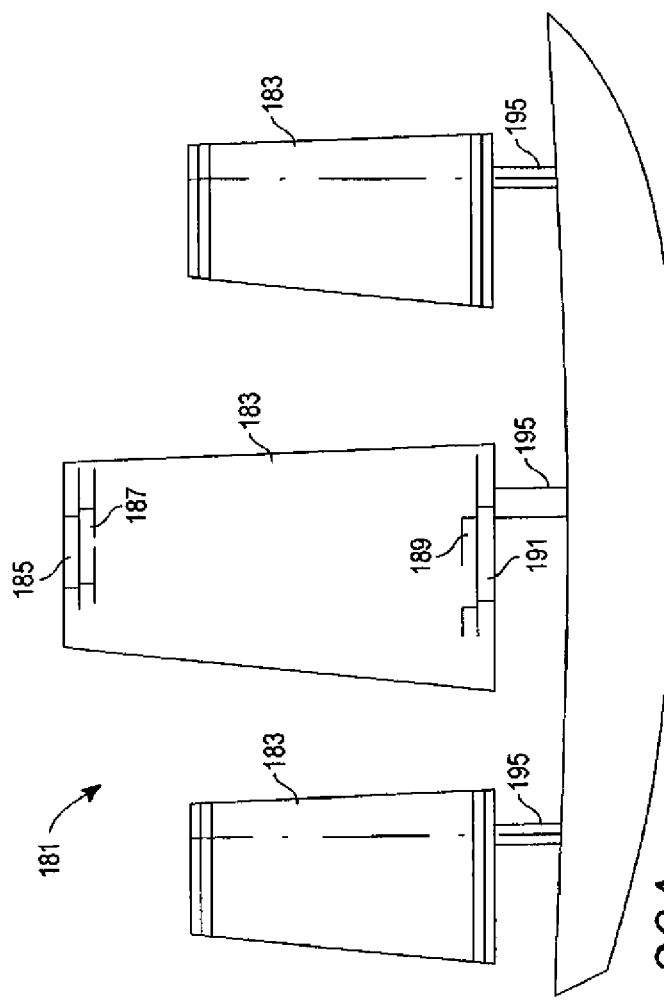
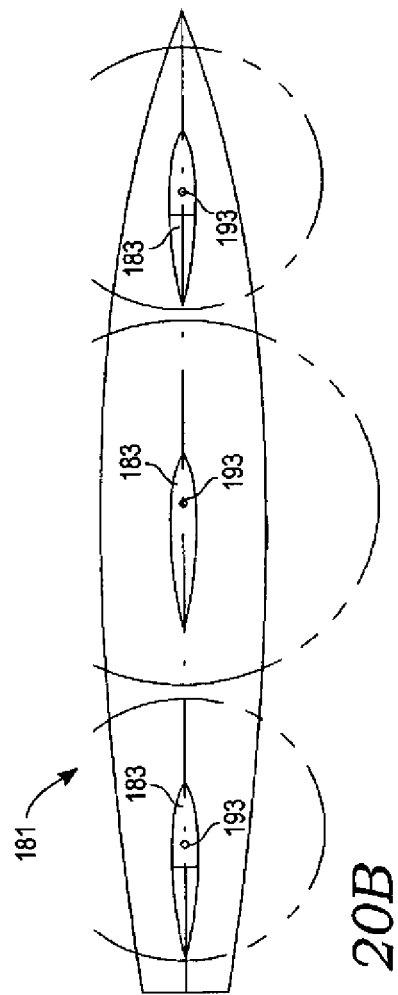

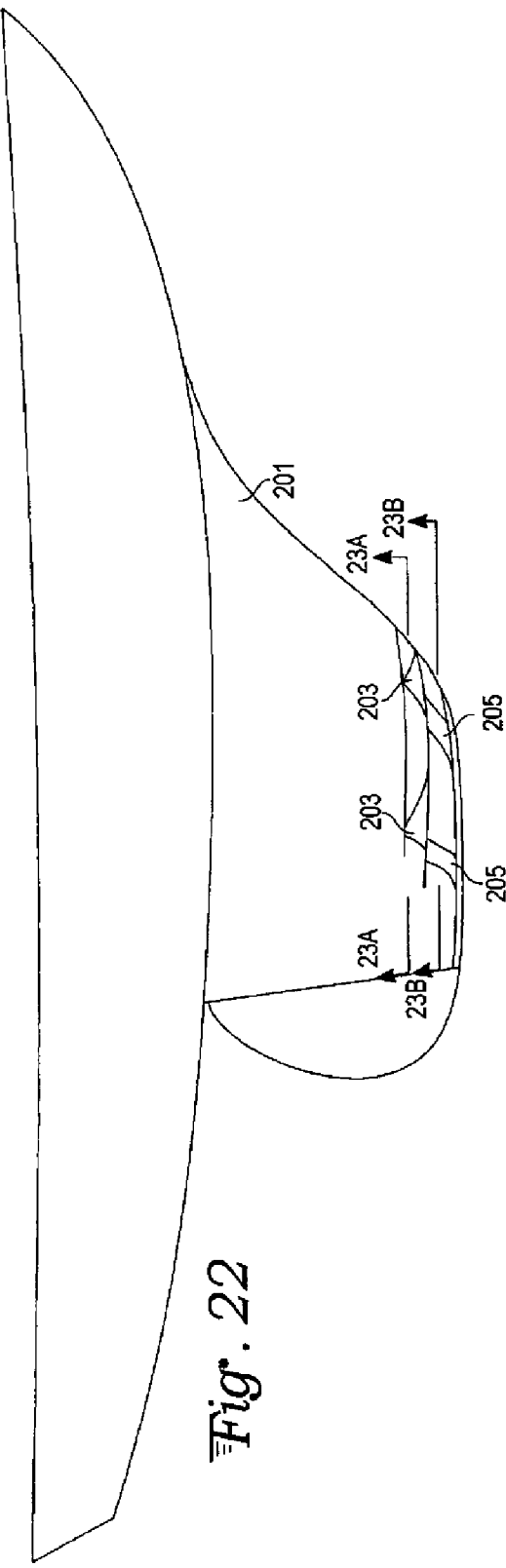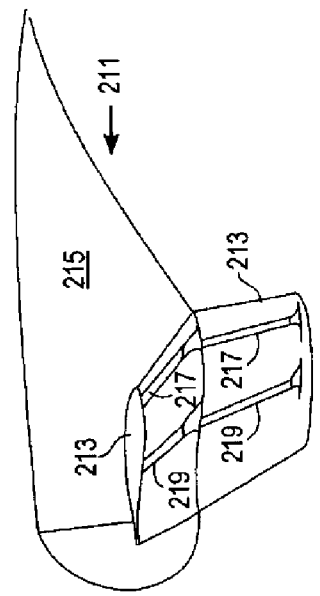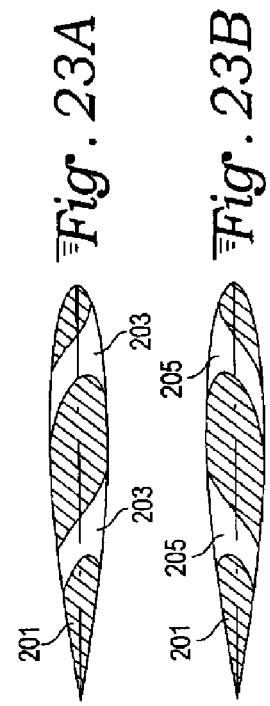

FLUID DYNAMIC BODY HAVING ESCAPELET OPENINGS FOR REDUCING INDUCED AND INTERFERENCE DRAG, AND ENERGIZING STAGNANT FLOW

TECHNICAL FIELD

The present invention relates to improvements to fluid dynamic bodies and related fluid dynamic structures for influencing or controlling aerodynamic or hydrodynamic flows to reduce drag, such as drag and turbulence induced by wingtip vortices of an aircraft, cooling and ventilating drags, or such as is found in the wake of a watercraft.

BACKGROUND ART

Various devices have been used for years in many aircraft wing designs in order to prevent the airflow from separating prematurely from the wing at high angles of attack, and thereby reduce the stall speed and improve handling at low speeds. Air from below the wing accelerates through the device and exits rearward and substantially parallel to the upper wing surface, energizing the boundary layer and delaying separation. A similar approach provides a pressurized discharge from wing surface openings, either from compressed air tanks, pumps, or from the jet engines, to accomplish a similar goal. Because most of the devices also tend to contribute to drag at cruising speeds, retractable devices may be used instead to provide adjustable modifications that can be closed when not needed. Other devices may also be used to reduce wave drag under transonic conditions to distribute pressure and increase the critical Mach number, thereby improving performance at such speeds. Variations of this basic theme of using slots, slats or other devices to ensure more attached flow across the wing surfaces and delayed boundary layer separation are described in U.S. Pat. No. 2,041,786 (Stalker); U.S. Pat. No. 2,507,611 (Pappas et al.); U.S. Pat. No. 2,571,304 (Stalker); U.S. Pat. No. 2,587,359 (Milans); U.S. Pat. No. 3,208,693 (Riedler et al.); U.S. Pat. No. 3,363,859 (Watts); U.S. Pat. No. 3,897,029 (Calderon); U.S. Pat. No. 4,641,799 (Quast et al.); U.S. Pat. No. 4,664,345 (Lurz); U.S. Pat. No. 5,255,881 (Rao); U.S. Pat. No. 5,788,190 (Siers); U.S. Pat. No. 6,293,497 (Kelley-Wickemeyer et al.); U.S. Pat. No. 6,328,265 (Dizdarevic); U.S. Pat. No. 6,905,092 (Somers); U.S. Pat. No. 7,048,235 (McLean et al.); and U.S. Patent Application Publication No. 2007/0034746 (Shmilovich et al).

Another problem in aircraft design is the formation of trailing vortices and wake turbulence during flight. Throughout the history of aeronautics, aircraft designers have had to deal with the energy consuming effects of wingtip vortices, which form at the tip of a wing where higher pressure air from beneath the wing flows in a generally span-wise direction around the wingtip to the lower pressure region above the wing. Wingtip vortices have been considered by many experts to be an essentially unavoidable consequence of a wing producing lift. These vortices are associated with lift-induced drag and are a major component of wake turbulence. Smaller vortices are induced at other points on an aircraft wherever there is an abrupt change in planform or contour, such as at the outboard tips of wing flaps, ailerons, horizontal stabilizers, elevators and other flight control surfaces. The drag and wake turbulence from the vortices have a negative impact on fuel efficiency and flight performance of the aircraft, and also pose a safety hazard to any aircraft that follow too closely or otherwise cross the wake.

Various solutions have been developed in an effort to reduce the formation of trailing vortices, especially wingtip vortices. Since wingtip vortices only affect that portion of a wing closest to its tip, one partial solution is to use a higher aspect ratio wing (longer wingspan and/or reduced chord), but this also tends to reduce aircraft maneuverability and adds structural weight. Another approach is to modify the lift distribution along the span to generate more lift at the wing root and less toward the wing tip, by modifying the wing planform and twist. However, these solutions do not make full use of the wingspan to efficiently produce lift.

A number of wingtip devices have been designed to allow nearly the entire wingspan to produce lift, while simultaneously altering the airflow near the wingtips in order to affect the vortices or to change the pattern of vorticity so as to reduce the associated drag. The intended result is reduced drag, with a corresponding improvement in fuel efficiency. Drooped (Hoerner) wingtips focus the vortex away from the upper wing surface. Winglets, a near-vertical upward or downward extension of the wingtips, cause the vortex to strike the surfaces of the winglet so as to generate an inward and slightly forward force, and thereby convert some of the vortex energy into an apparent thrust. Wingtip fences are winglet variations that may have surfaces extending both above and below the wingtip to reduce the span-wise component of airflow that leads to wingtip vortices, but create new vortices at the fence tips as well as interference drag, albeit displaced from the main wing. Blended winglets smoothly curve up, increasing their cant gradually to reduce interference drag that would otherwise occur at the wing/winglet junction. Raked wingtips have a higher degree of sweep than the rest of the wing. Various wingtip devices are described, for example, in U.S. Pat. No. 5,039,032 (Rudolf); U.S. Pat. No. 5,634,613 (McCarthy); U.S. Pat. No. 6,722,615 (Heller et al,); and U.S. Pat. No. 6,892,988 (Hugues).

In U.S. Pat. No. 5,823,480, La Roche provides a wing grid having at least two parallel staggered "winglets" extending outward from the free end (tip) of the wing. The winglets, which in this case are essentially parallel to the main wing rather than upward extending, subdivide the air circulation at the tip so that the span-wise lift distribution is more regular, decreasing induced resistance. In one embodiment, this wing grid can be retracted into the end of the wing.

In U.S. Pat. No. 4,478,380, Frakes discloses a wingtip vortex suppressor that utilizes a scoop having an inlet at a lower leading surface and an outlet at an upper trailing surface to reduce the pressure differential at the wing's trailing edge. The scoop is inboard of a turbulence fence at the wingtip. In another arrangement, U.S. Pat. No. 5,806,807 to Haney, has both a deflector extending from the top surface of the wing inboard of the tip and an air passage extending from an inlet on a high pressure side of an airfoil through the airfoil to an outlet on a low pressure side of the airfoil, with the outlet positioned between the deflector and the wing tip. The deflector and air passage work in combination to attenuate the wingtip vortex. In both patents it appears that the fence or deflector is an essential component for vortex reduction.

In U.S. Pat. No. 5,791,875, Ngo describes a system providing a source of positive fluid pressure interior to the wing and a fluid router (curved slots in lower surface of the wingtip) that directs the fluid inboard against the outward airflow in order to reduce the wingtip vortex. Similarly, in U.S. Pat. No. 7,134,631, Loth provides a tip circulation control that blows air out from the very end of the wing in order to cancel opposing vorticity. In U.S. Pat. No. 7,100,875, Shmilovich et al discharge a jet air stream from a set of nozzles at the wingtips and moves them cyclically back and forth in order to dissipate and scatter wingtip vortices. Although from a safety standpoint any reduction in trailing vortices is an improvement, from an energy efficiency standpoint the amount of energy required to sustain such counteracting airflows tends to defeat any fuel savings that might be achieved by a decrease in drag.

Trailing vortices and wake turbulence can also cause drag in other fluid dynamic structures, such as in rotor blades in helicopters and wind-power turbines, sails (which are also wings), and underwater surfaces such as hydrofoils, hulls, centerboards, keels, rudders and screws of various watercraft including submersibles. U.S. Pat. No. 5,374,013 to Bassett et al. describes one approach to reducing drag in a truck by providing a pressure shell around the rear of the truck body with better boundary flow around the truck. In any of these fluid dynamic structures, it is desired to realize fuel savings and safety improvements by reducing trailing vortices and wake turbulence, whether from wings and other flight control surfaces on aircraft, or from any of the other foil-like or bluff bodies.

SUMMARY DISCLOSURE

A fluid dynamic body in accord with the present invention comprises a fluid dynamic body for use in a fluid dynamic environment and having one or more fixed size escapelets in the form of static streamlined flow passages integrated into the fluid dynamic body and leading from a first higher pressure surface of the body to a second lower pressure surface of the body. Each escapelet is configured in size, shape, location, orientation and number so as to maintain primarily streamline flow and redirect any span-wise component of energy in a kind of shortcut from the high-pressure side to the low-pressure side of the structure, beneficially releasing energy and reducing or preempting the normal formation of vortices. Whatever span-wise component of fluid flow that might leak around an end of the fluid dynamic body gets caught up in the high velocity current exiting longitudinally from the escapelet outlets. Each escapelet is sized and positioned to minimize its impact on the longitudinal component flow, thereby reducing the drag and resulting in dramatic fuel savings. The "longitudinal" flow direction refers always in this specification to the chordwise (fore-aft) direction, i.e., from the leading to trailing edges of the foil body. Despite creating passages from the higher-pressure side to the lower-pressure side of fluid dynamic structures, the elimination of unproductive components of fluid flow from the use of these escapelets results in an overall increase in the effective aspect ratio by as much as 50% or more. Thus, the escapelets act to harness, redirect and release fluid dynamic energy in a manner that reduces chaotic energy dissipation and minimizes energy loss. As an additional benefit, escapelets located near wingtips effectively increase control authority to ailerons, thereby improving such authority even at high angles of attack up to and including spin conditions, while escapelets located inboard on the wings near the fuselage and/or on the horizontal tail sections may further improve spin recovery whenever needed.

Escapelets have fixed sizes that are typically such that their widths range from 1% to 15% of the fluid dynamic body's span. Escapelets may be generally installed between or around ribs or other structures of the fluid dynamic body, so lengths of the individual escapelets do not typically extend a full span. The cumulative span of a set of escapelets along a common planform of the fluid dynamic body is usually less than a half-span of the foil body. In one embodiment, the locations of the escapelets may be confined to an outboard portion of the fluid dynamic body half-span. Escapelet outlets from the lower-pressure side of the fluid dynamic body usually have a measure normal to the surface that may range anywhere from 10% to 110% of the measure of the corresponding escapelet inlet on the higher-pressure side of the fluid dynamic body, with the higher values generally applying to craft of higher design speeds. Escapelet outlets are located downstream or aft of the escapelet inlets. Escapelet sizes and locations may be modified to accommodate operation at higher subsonic Mach numbers or other operating conditions. The spanwise orientation of the escapelets generally follows the planform of the fluid dynamic body. For example, where the escapelet openings include one or more leading escapelets and/or one or more trailing escapelets, the leading escapelet openings may be substantially parallel to a leading edge of the fluid dynamic body, while the trailing escapelet openings may be substantially parallel to a trailing edge of the fluid dynamic body. The escapelets are carefully contoured to establish and maintain primarily streamline flow, and may include a preformed liner insert to eliminate any discontinuities or sharp intersections and ensure such streamlined surface smoothness and contours.

The fluid dynamic structures that could incorporate this improvement may include not only aircraft wings, but also aircraft control surfaces, such as ailerons, flaps, aircraft empennages, canards, including stabilizers, elevators, fins, rudders, together with rotor blades, propeller blades, turbofans, ducted fans, and wind tunnel drive fans, as found on both helicopters and wind-power turbines, as well as fluid dynamic bodies on various watercraft, including sails, wing sails and various underwater structures like keels, and various other structures such as cables, guy-wires, poles, power lines, stacks and towers. The presence of the escapelet openings in the various fluid dynamic bodies significantly reduce trailing vortices and wake turbulence, with a consequent reduction in drag and corresponding improvements in energy efficiency.

BRIEF DESCRIPTION OF THE DRAWINGS

The drawings illustrate some possible applications of the concept.

FIGS. 1A-1C and 2A-2C are various plan and isometric views of an outboard end portion of respective upper and lower wing surfaces for an unswept wing implementing an embodiment of the present invention.

FIGS. 3A-3C and 4A-4C are various plan and isometric views of an outboard end portion of respective upper and lower wing surfaces for a swept wing implementing another embodiment of the present invention.

FIG. 5 is a chord-wise sectional view through an escapelet for the wing of FIGS. 3A-3C and 4A-4C.

FIGS. 6A-6F are various span-wise vertical sectional views showing some different embodiments of escapelet endwalls on the aircraft's starboard wing.

FIGS. 7-11 are plan views of alternative wing embodiments in accord with the present invention.

FIG. 12 is a top plan view of a wing attached to a fuselage, and illustrating several different potential positions for escapelets in accord with the present invention.

FIGS. 13A-13B are perspective views of respective upper and lower surfaces of a horizontal tail section implementing an embodiment of the present invention.

FIGS. 14A-14B are chord-wise sectional views of generic fluid dynamic structures provided for specifying dimensions of escapelets. FIG. 14B also illustrates possible incorporation of an escapelet in a control surface, such as an aileron.

FIGS. 15A-15B are respective side and isometric views of an airfoil used as a parachute, hang glider or kite and implementing escapelets in the airfoil in accord with the present invention.

FIG. 16 is an isometric view of a rotary blade embodiment of the present invention.

FIGS. 17A-17C are various sections of an end of a rotary blade, as in FIG. 16, with one or more escapelets, for a propeller blade, a wind turbine blade and helicopter main and/or tail rotor blades, respectively.

FIG. 18 is an isometric view of a guy wire embodiment having foil sections of escapelets in accord with the present invention.

FIGS. 19A-19C are a cross-sectional view and two isometric views of segments of the foil sections in FIG. 18.

FIGS. 20A-20B are side view and top plan view of a ship having wing sails with escapelets therein in accord with the present invention.

FIG. 21 is an isometric view of a wing sail in FIGS. 20A-20B.

FIG. 22 is a side view of an underwater portion of a watercraft having a keel embodiment of the present invention.

FIGS. 23A-23B are sectional views taken through the lines 23A-23A and 23B-23B in FIG. 22.

FIG. 24 is an isometric view of a wing keel embodiment of the present invention.

FIGS. 25A-25B are sectional views illustrating the presence of escapelets provided in a high performance cowl that houses an air-cooled engine.

DETAILED DESCRIPTION

In order to better understand the improvements, we note first that slots, slats and slotted flaps have the purpose of increasing the maximum lift coefficient, thereby reducing the stall speed, while the escapelets provided within the various fluid dynamic bodies in accord with the present invention have instead the purpose of preemptively redirecting fluid flow energy before it can cause undesirable results such as vortices, wake turbulence, and drag with consequent wasteful energy dissipation. The escapelets harness, redirect and release the energy beneficially so as to minimize such energy losses. In addition to the benefits already discussed, escapelets may also be employed to reduce turbulence due to flow separation, thus making the associated flows more efficient.

"slot" (noun)—a long and narrow opening as between a wing and a Fowler flap; specif. a long and narrow spanwise passage in a wing usually near the leading edge for improving flow conditions at high angles of attack.

"slat" (noun)—any of certain long narrow vanes or auxiliary airfoils, e.g. as used in an automatic slot.

"automatic slot" (noun)—a slot in the leading edge of a wing created by the movement of a slat that is retained in the leading edge contour of a wing at most angles of attack, but automatically lifting away to create a slot as the stalling angle is approached.

"fixed slot" (noun)—a slot that remains open at all times; distinguished from an adjustable or an automatic slot.

A slotted flap is an adjustable mechanism on the trailing edge of a fluid dynamic foil section that moves into position when deployed. In contrast, an escapelet is a primarily streamline flow passage built into a fluid dynamic foil section.

The primarily streamline flow passages that form the escapelets through the fluid dynamic body act to improve fluid dynamic characteristics without physical changes in chord or camber of the fluid dynamic body, acting to reduce induced and interference drag by preempting or significantly reducing the formation of vortices and energizing stagnant flow. Additionally, the changes to fluid flow arising from the use of escapelets in some locations improve control authority of ailerons and/or other control surfaces and high-lift devices and enhance spin recovery. The end result is a unique device that accomplishes aerodynamic results never before achieved.

With reference to FIGS. 1A-1C, three views of the top of an end portion of a wing 11 with a leading edge 13 and a trailing edge 15 of the wing 11 are seen. The wing has escapelets 17 and 19 inboard of a wingtip 21 in accord with the present invention. An aileron 23 on the trailing edge 15 of the wing 11 is also seen. FIGS. 2A-2C show three views of the bottom side of the same wing 11. As seen in the various views, the escapelets 17 and 19 are passages leading from the lower wing surface 25 through the wing 11 to the upper wing surface 27. In this embodiment, two escapelets 17 and 19 are provided in series. A series of anywhere from one to seven escapelets could be provided along the local chord of the wing.

With reference to FIGS. 3A-3C, three views of the top of an end portion of another wing 31 with a leading edge 33 and trailing edge 35 of the wing 31, escapelets 37 and 39, and an aileron 43, are shown. FIGS. 4A-4C show the corresponding bottom side of the wing 31. Again, escapelets 37 and 39 are provided through the wing 31. In this instance, the wing is a swept wing, whereas in FIGS. 1A-1C and 2A-2C; an unswept wing was used. Escapelets can be provided with either an unswept wing 11 or swept wing 31 designs.

In both cases, the escapelets generally follow the planform of the wing. In the case of the unswept wing 11 in FIGS. 1A-1C and 2A-2C, this leads to the escapelets being oriented substantially parallel to the corresponding leading and trailing edges 13 and 15 of the wing 11. In the case of the swept wing 31 in FIGS. 3A-3C and 4A-4C, the leading and trailing edges 33 and 35 and the escapelets 37 and 39 essentially follow the planform of the wing 31.

The positions of the escapelets 17, 19, 37, and 39 on their wings 11 and 31 do not necessarily line up with the ailerons 23 and 43 or any other flight control structure of the wing. In the first case, the outer ends of escapelets 17 and 19 do happen to align with the outer edge of the aileron 23, but this is not required. The aileron 23 is seen to extend inboard beyond the views and beyond the inner ends of escapelets 17 and 19, but again, this is not necessarily required. In the swept wing example, the ends of the escapelets 37 and 39 do not align with either edge of the aileron 43, but rather the escapelets 37 and 39 are positioned to overlap the outer edge of the aileron 43. These escapelets 37 and 39 could just as easily align with say the outer edge of the aileron, as in the unswept wing example. Generally, it may be preferred for optimum performance that one or more escapelets be associated in some manner, either by being aligned or overlapping with, the outer edge of the aileron 23 or 43, but it is not an absolute requirement. The mere presence of the escapelets and their action upon the airflow across the fluid dynamic body helps to transfer better control to the ailerons and other similar structures.

With reference to FIG. 5, a cross-section of the swept wing embodiment of FIGS. 3A-3C and 4A-4C is seen. The section for an unswept wing design would be similar. The escapelets 17 and 19 extend through the wing 11 from inlets 51 located in the lower wing surface 25 to the outlets 53 located in the upper wing surface 27. The general direction of the escapelets 17 and 19 is aft, i.e., the inlets 51 are closer to the leading edge 13, while the outlets 53 are closer to the trailing edge 15 of the wing 11. The escapelets 17 and 19 also tend to be streamlined in their shape for best performance. Fairings or fillets 55 may be inserted into the escapelet passages to eliminate any sharp edges, corners, or discontinuities in order to eliminate turbulence and interference drag. Preferred dimensions will be discussed later with respect to FIG. 14A.

As seen in FIGS. 6A-6F, the span-wise cross sections show examples of some possible choices for the inboard and outboard ends of the escapelets. These ends may be straight as in FIGS. 6A-6C or have some curvature as in FIGS. 6D-6F. The inlets and the outlets may have different spans as in FIGS. 6A-6F. Typically, a shorter outlet would often be preferred, leading to airflow acceleration within the escapelet passages, but the other choices may also be viable or even preferred in some escapelet applications, whether on wings or other surfaces.

FIGS. 7-11 show a variety of potential positions for escapelets on a wing. In FIG. 7, a pair of escapelets 61 and 63 is located outboard of a leading edge slat 65, and also overlapping with the outboard of an aileron 67. In FIG. 8, a first escapelet 71 closer to a leading edge 73 is shorter in span than a second escapelet 75 closer to a trailing edge 77. Thus, the escapelets in a series need not have identical spans. Likewise, in FIG. 9, escapelet 81 is shorter than escapelet 83. In FIG. 8, the span-wise centers of the two escapelets 71 and 75 are substantially aligned, while in FIG. 9, the outer ends of the escapelets 81 and 83 are aligned. Either embodiment or any other relative positioning of a series of escapelets could be employed. In FIG. 10, the leading escapelet 91 is longer in span than the trailing escapelet 93 in the series. Additionally, the respective ends of the escapelets 91 and 93 follow common contours 95. In FIG. 11, the common end contours 97 are straight, whereas in FIG. 10, the common end contours 95 are curved. Either configuration could be used.

While FIGS. 1-11 have focused on the outer ends of wings, near the wingtips, mainly to preempt significant formation of trailing vortices, other escapelet positions can be used. As shown in FIG. 12, in addition to the escapelets 101 found near the wingtips and/or associated with the ailerons, additional sets of escapelets 103 may be provided on one or both sides of the engine pylon mounts or may be associated with other structures attached to or part of the fluid dynamic body. Still further, escapelets 105 may be provided on the wing adjacent to the fuselage 107 to energize stagnant flow. This later positioning of escapelets helps to substantially reduce interference drag at the higher angles of attack when the aircraft is ascending, descending, or maneuvering. Additionally, they preempt or reduce the formation of vortices and/or other undesirable fluid dynamic phenomena that could interfere with the airflow over the tail section or other parts on a craft.

With reference to FIGS. 13A and 13B, respective upper and lower views of a horizontal tail surface 111 show that provision of escapelets, as shown at 113, 115, 117, and 119, need not be confined solely to the main wing of an aircraft, and preferably will indeed be provided on such tail surfaces. One should be reminded that horizontal tail surfaces are inverted from those of the main wing in order to provide a pitch-corrective downward force, using elevators 125 on the trailing edge as pitch control surfaces. Escapelet inlets are on the higher-pressure upper surface 121 of the horizontal tail section 111, while escapelet outlets are on the lower-pressure lower surface 123 of the horizontal tail surface 111. As in the main wing, escapelets 113 and 115 provided near the tip of the tail section preempt or reduce the formation of trailing vortices, thereby substantially reducing induced drag. While vortices from tail surfaces are not nearly as prominent as those from a main wing, they are still not insubstantial, and fuel savings can be realized by providing escapelets on these tail surfaces as well as on the main wing. Escapelets 117 and 119 located inboard near the intersection of a vertical stabilizer/rudder can help substantially to control yaw and recovery from spin situations that might occur. Additionally, escapelets can help to counter adverse yaw due to asymmetric engine thrust, as when one engine of a twin- or multi-engine aircraft fails and the remaining engines provide all of the thrust from one side of the plane. FIGS. 13A and 13B show a horizontal tail section's inboard escapelets 117 and 119 which allow energized air to reach the vertical stabilizer/rudder (not shown), providing more control to be transferred to the aircraft's rudder.

With reference to FIG. 14A, dimensions for the escapelets are generally defined relative to a local chord line (0) of the fluid dynamic body extending from the leading edge to the trailing edge, the length of which is defined as 100%. As already noted, there may be one, two, or more escapelets (1) in series spaced along the chord (0). Four escapelets (1) are seen in FIG. 14A. FIG. 14B shows that the aft-most escapelet 131 could be formed in a flight control surface 133, such as an aileron, elevator, or flap, e.g., pivoting relative to the main wing or tail section 135 about some pivot point 137. However, in most cases, the escapelets will be completely contained within the main foil contour. Escapelet outlet sizes (2) are measured normal to the aft surface (6) of the escapelet (1) from a point (5) at the trailing edge of the fore surface (7) of the escapelet (1). The outlet size (2) may range anywhere from 0.75% to 15.4% of the chord (0). Likewise, escapelet inlet (3) sizes are measured normal to the aft surface (6) of the escapelet (1) from a point of tangency of the original foil section and the escapelet fore body (7) intersection shown as point (8), to the shortest dimension to the aft escapelet body (6). The size of the inlet (3) may range anywhere from 0.85% to 40.65% of the chord (0). The escapelet (1) may either converge or diverge, as required, but generally, the outlet size (2) ranges anywhere from 10% to 110% of the inlet size (3), with the higher values in the range generally applying to craft with higher design speeds. Escapelet outlets are located downstream or aft of the escapelet inlets, with a center-of-inlet (9) to center-of-outlet (10) mean line of an escapelet oriented chord-wise at an angle (θ) ranging anywhere from 10° to 80° relative to the chord line, with the lower value generally applying to craft of higher design speeds.

With reference to FIGS. 15A and 15B, the use of escapelets is not confined to fixed-wing airplanes, as in FIGS. 1 through 14, but could be applied to other fluid dynamic bodies, such as 141, and other fluid dynamic bodies, such as parachutes, hang gliders, ultra-light aircraft, work kites, recreational or emergency devices, and even toys and toy kites. As seen in FIG. 15B, a fluid dynamic body 141 of this type may have one, two, or more escapelets 143-145 located near both outer portions of the fluid dynamic body 141. By preempting or reducing the formation of vortices and ensuring proper airflow, these escapelets increase the effective aspect ratio significantly when compared to similar foil sections without such escapelets. A higher stall angle of attack and reduction of the stall speed is also a consequence of the improved airflow created by the escapelets.

With reference to FIG. 16, a rotary blade 151 is seen, with a point of attachment 153 to a rotational shaft (not shown), respective leading and trailing edges 157 and 155, and provided with escapelets 159 near a blade tip 161. The rotary blade 151 provided with such escapelets 159 can be positioned within a wind turbine, a propeller, or helicopter blade at one or more locations along said blades as shown by the respective sections seen in FIGS. 17A-17C. Although each type of rotary blade 151 may have different foil cross-sections, based on such factors as optimum angle of attack and rotational speed for the particular application, the design is further optimized by the presence of escapelets. Although only escapelets 159 located near the blade's outer tip 161 are shown, other escapelet locations might also have some benefits, particularly in countering the naturally outward radial flow over a rotating blade.

With reference to FIG. 18, foil fairings 171 for placement around structures such as guy wires, cables, power lines, poles, towers and stacks are shown with escapelets. FIGS. 19A-19C show various isometric views of individual segments 173 of such foil fairings 171. Such foil fairings are installed around guy wires to control flutter and the flow-driven whipping action and vibration that causes fatigue and potential structure damage. The frame 171 acts to direct the flow smoothly around the guy wires. To minimize turbulence (by preventing the von Karman vortex street flow), the foil fairing 171 in accord with the present invention includes an escapelet 175 passing from one side of each segment 173 to the opposite side. Alternate segments 173 may have escapelets 175 and 175' directing air to opposite sides of each individual escapelet component 173, as seen in FIG. 18.

With reference to FIGS. 20A-20B and FIG. 21, the use of escapelets can be applied to watercraft as well. Here, a boat or ship 181 having one or more wing sails 183 is seen. Each wing sail 183 may have one or more sets of escapelets 185, 187, 189, 191, etc. Preferably, both upper and lower ends of the wing sail 183 will have such modifications, with one or more sets of escapelets 185 and 187 near the top of the wing sail and one or more sets of escapelets 189 and 191 near the bottom of the wing sail. Furthermore, the escapelets are preferably organized in pairs with one set of escapelets 185 or 189 of a pair passing air through the wing sail 183 from port to starboard and another set of escapelets 187 or 191 of a pair passing air through the wing sail 183 in the opposite direction from starboard to port. This allows the full effect of the escapelets to occur no matter from which direction the wind is coming. Each wing sail 183 can be turned about its pivot axis 193 established by the respective masts 195.

Fluid dynamic structures having foil bodies containing escapelets need not be confined solely to aerodynamic structures, but can also apply to hydrodynamic structures. As seen in FIG. 22 and FIGS. 23A-23B, a ship or boat keel 201 acts as a hydrodynamic body with corresponding problems of trailing wakes and associated drag. Due to wake turbulence, the maximum hull speed is limited based on the length of the waterline. Additionally, the bow wave has erosion effects on nearby shorelines, causing speed limits to be imposed on watercraft to avoid causing a wake. The keel 201 may therefore be provided with one or more sets of escapelets 203 and 205. The sets of escapelets are installed in port and starboard sets, with a set of one or more escapelets 203 passing water or other fluid through the keel from starboard to port and another set of one or more escapelets 205 passing water or other fluid in the opposite direction through the keel, i.e., from port to starboard.

A variety of keel types can employ such escapelets. As seen in FIG. 24, a wing keel 211 has a pair of underwater wings 213 projecting outward from a vertical keel 215 and these fluid dynamic bodies provide lift to the vessel. As in aircraft wings, the underwater wings 213 are provided with one or more escapelets 217 and 219 passing water or other fluid from a higher-pressure underside of the wings 213 to a lower-pressure upper side of the wings 213. The escapelets may be positioned near the wing tips, more inboard near the vertical keel, or across nearly the entire wingspan. The vertical keel 215 might also be provided with escapelets as in FIG. 22. Other underwater structures such as hydrofoils, movable keels, dagger boards, and rudders may also advantageously be fitted with escapelets to ensure improved flow.

FIGS. 25A and 25B show a typical high performance cowl for housing an air-cooled engine. The cowl includes a primarily streamline flow escapelet installation with inlets 220 and outlets 222 in the walls. There may be one or more escapelets anywhere in the cowl; two per side are shown in the illustrated embodiment. By increasing airflow through the cowl and reducing drag, the escapelets have the added benefit of improving the cooling efficiency of the cowl. Escapelets inlets 220 are located in areas of the cowling walls where relatively higher pressure air is expected during normal operation, while escapelet outlets 222 are located in areas of the cowling walls where relatively lower pressure air is expected during normal operation, so that air flow through the cowl is enhanced by the pressure differential between inlets 220 and outlets 222. The pressure of the escapelet inlets provides cooling air to the engine within the cowl, while the presence of the escapelet outlets improve extraction of the warmed air.

Tests were devised to demonstrate and measure the effectiveness of the escapelets. Several glider models were built for early evaluation. The results were very favorable, so large-scale radio-controlled models were built for quantitative tests and measurements. The models were built such that the wing tips were interchangeable, having the same planform, weight and center of gravity location, but with and without escapelets. For documented flight testing, each of three large-scale models as above were flight tested as follows: each test was conducted over a realistic and controlled sequence of conditions from takeoff to level flight at specified cruising speeds to landing, with and without the escapelets. It is notable that introduction of the escapelets did not require any trim control adjustments to maintain level hands off flight. Each flight test sequence was repeated several times, and the results were averaged.

To assure the veracity of the data collected in the test flights, a standard flight profile was developed to be followed for each test. Comparative flights with and without escapelets were conducted immediately following each other to reduce the effects of any changes in the atmospheric conditions. All times were recorded with a stopwatch. Some of the flights equipped with escapelets ran a few seconds longer than standard flights with the unmodified aircraft, and all fuel measurements were taken with a digital scale. Fuel burn was measured to the nearest gram. Then, fuel consumption comparisons were made. The data from each vehicle below is an average of all of the flights of that vehicle. The test flight profile was as follows:

1) Start, radio check, taxi, hold (2 minutes)
2) Takeoff
3) Fly one lap around field at full power
4) Reduce to cruise power
5) Time lap speed and fly several laps in a racetrack pattern
6) Land, taxi, stop
7) Accurately measure weight of fuel required to refill tank Test One Results The recorded flight speed for this test series was an average of 50 mph, and the coefficient of lift (CL) was calculated to be 0.25.

Conditions:
  Wind: 0-5 mph gusting
  Temperature: 68° F.
  Barometric Pressure: 29.92 in Hg
Standard Flight (without Escapelets):
  Duration: 900 seconds
  Fuel Burn: 107 grams

11

Modified Flight (Equipped with Escapelets):
  Duration: 900 seconds
  Fuel Burn: 93 grams
Fuel Savings, %:
  12.54% total flight
  16.99% cruise
Test Two Results
The recorded flight speed for this test series was an average of 60 mph, and the coefficient of lift (CL) was calculated to be 0.5.
Conditions:
  Wind: 0-2 mph
  Temperature: 27° F.
  Barometric Pressure: 29.92 in Hg
Standard Flight (without Escapelets):
  Duration: 606 seconds
  Fuel Burn: 178 grams
Modified Flight (Equipped with Escapelets):
  Duration: 606 seconds—adjusted from 616 seconds
  Fuel Burn: 138.71 grams—adjusted from 141 grams
Fuel Savings, %:
  22.08% total flight
  29.92% cruise
Test Three Results
The recorded flight speed for this test series was an average of 78 mph, and the coefficient of lift (CL) was calculated to be 0.3.
Conditions:
  Wind: 0-2 mph
  Temperature: 82.6° F.
  Barometric Pressure: 29.82 in Hg
Standard Flight (without Escapelets):
  Duration: 509 seconds
  Fuel Burn: 228 grams
Modified Flight (Equipped with Escapelets):
  Duration: 509 seconds—adjusted from 515 seconds
  Fuel Burn: 192.7 grams—adjusted from 195 grams
Fuel Savings, %:
  15.48% total flight
  20.98% cruise These fuel savings results correspond to a drag reduction, varying from 25% to 50%, depending on the lift coefficient.

What is claimed is:

1. A fluid dynamic body configured to move through a fluid; wherein the fluid is a liquid or a gas, said fluid dynamic body comprising:
  a foil-shaped body having a thickness, a chord direction and a span dimension, said foil-shaped body having at least one passage therethrough, said at least one passage being formed as an escapelet leading from an inlet in a first higher pressure surface of said foil-shaped body to an outlet in a second lower pressure surface of said foil-shaped body, an inner surface of said escapelet being specifically contoured so as to provide primarily streamlined laminar flow through the at least one passage, said escapelet having a thickness, a chord direction and a span dimension defined by contoured endwalls at each spanwise end thereof, said endwalls effective for directing momentum of a mass fluid flow exiting from said escapelet,
  said outlet being located downstream of said inlet with a center-of-inlet to center-of-outlet mean line oriented at an angle ranging anywhere from 10° to 80° with respect to a chord line of said foil-shaped body, said outlet being directed streamwise,
  said inlet with an inlet measure of at least 0.85% of a local chord length of said foil-shaped body and said outlet

12 with an outlet measure of at least 0.75% of said local chord length, said outlet having a size in a range from 10% to 110% of a size of said inlet,
  said outlet of the escapelet being contoured and positioned such that the mass fluid flow exiting in a streamwise direction from the escapelet redirects spanwise fluid flow over the foil-shaped body toward a less spanwise and more streamwise direction, thereby energizing stagnant flow in various areas and reducing induced and interference drag and also thereby reducing vortex generation, so as to improve control, and reduce energy and fuel consumption by maintaining improved flow over the surfaces of the foil-shaped body thus preempting undesirable flows that create higher drag and loss of control.

2. The fluid dynamic body of claim 1, further comprising support ribs, wherein said escapelet is located between or around said support ribs.

3. The fluid dynamic body of claim 1, wherein said escapelet includes at least one fairing to further reduce any sharp edges, corners, or discontinuities in order to reduce turbulence and drag.

4. The fluid dynamic body of claim 1, wherein said foil-shaped body comprises a wing.

5. The fluid dynamic body of claim 1, wherein said foil-shaped body comprises an empennage.

6. The fluid dynamic body of claim 1, wherein said foil-shaped body comprises a fluid dynamic control surface.

7. The fluid dynamic body of claim 6, wherein said fluid dynamic control surface comprises ailerons, flaps, canards, stabilizers, elevators, fins, and rudders.

8. The fluid dynamic body of claim 1, wherein said foil-shaped body comprises any one of a blade of a rotor, helicopter, propeller, wind turbine, turbofan, ducted fan, or wind tunnel drive fan.

9. The fluid dynamic body of claim 1, wherein said fluid dynamic body comprises a watercraft sail or a wing sail.

10. The fluid dynamic body of claim 1, wherein said fluid dynamic body comprises any one or more of hydrofoil, watercraft keel, wing keel, movable keel, dagger board, and rudder.

11. The fluid dynamic body of claim 1, wherein said fluid dynamic body comprises any one of a parachute, hang glider, ultra-light aircraft, work kite, recreational or emergency device, toy or toy kite.

12. The fluid dynamic body of claim 1, wherein said escapelet encloses or is an element of a structure such as cables, guy wires, poles, power lines, towers and stacks.

13. The fluid dynamic body of claim 1, wherein said escapelet includes at least one fillet to further reduce any sharp edges, corners, or discontinuities in order to reduce turbulence and drag.

14. A fluid dynamic body configured to move fluid or move through a fluid, wherein the fluid is a liquid or a gas, said fluid dynamic body comprising:
  a structure having a height, length and width, said structure having at least one passage therethrough, said at least one passage being formed as an escapelet leading from an inlet in a first higher pressure surface of said structure to an outlet in a second lower pressure surface of said structure, an inner surface of said escapelet being specifically contoured so as to provide primarily streamlined laminar flow through the at least one passage, said escapelet having a height, length and a width limited by contoured endwalls at each end of said escapelet effective for directing the momentum of a mass fluid flow exiting from said escapelet, said escapelet being contoured and positioned to conform to the shape of said structure, said outlet being located downstream of said inlet with a center-of-inlet to center-of-outlet mean line oriented at an angle ranging anywhere from 10° to 80° with respect to a body length, said outlet being directed streamwise, said escapelet having an inlet measure of at least 0.85% of a local length of said structure and an outlet measure of at least 0.75% of said local structure length, said outlet having a size in a range from 10% to 110% of a size of said inlet, said outlet of the escapelet being contoured and positioned such that the mass fluid flow exiting in a streamwise direction from the escapelet redirects widthwise fluid flow over the structure toward a more streamwise direction, thereby energizing stagnant flow and reducing interference drag, redirecting fluid flow efficiently along surfaces of said structure, so as to reduce turbulence and undesirable flows, improving flow control, and reduce energy consumption by maintaining improved flow over the surfaces of said structure thus preempting undesirable flows that create higher drag and loss of control.

15. The fluid dynamic body of claim 14, wherein said escapelet is a constituent of a cowl of an engine.

16. The fluid dynamic body of claim 14, wherein said escapelet is a constituent of a device for reducing cooling or ventilating drag.

17. The fluid dynamic body of claim 14, further comprising support structures, wherein said escapelet is located between or around said support structures.

18. The fluid dynamic body of claim 14, wherein said escapelet includes at least one fairing to further reduce any sharp edges, corners, or discontinuities in order to reduce turbulence and drag.

19. The fluid dynamic body of claim 14, wherein said structure comprises a fluid dynamic control surface.

20. The fluid dynamic body of claim 14, wherein said escapelet includes at least one fillet to further reduce any sharp edges, corners, or discontinuities in order to reduce turbulence and drag.

* * * * *